(12) United States Patent
Keller et al.

(10) Patent No.: US 11,323,306 B2
(45) Date of Patent: May 3, 2022

(54) SYSTEMS AND METHODS FOR ACCELERATED NETWORK IMPAIRMENT MAPPING

(71) Applicant: Cox Communications, Inc., Atlanta, GA (US)

(72) Inventors: Joseph Keller, Atlanta, GA (US); Sam Plant, Atlanta, GA (US); Shane Yates, Atlanta, GA (US); Christian Welin, Atlanta, GA (US); Alexis Hwang, Atlanta, GA (US); David Moon, Atlanta, GA (US); Brad Demerich, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/005,131

(22) Filed: Aug. 27, 2020

(65) Prior Publication Data

US 2022/0070049 A1    Mar. 3, 2022

(51) Int. Cl.
*H04L 12/24* (2006.01)
*H04L 12/26* (2006.01)
*H04L 12/28* (2006.01)
*H04L 41/0631* (2022.01)
*H04L 43/16* (2022.01)
*H04L 43/0817* (2022.01)
*H04L 41/22* (2022.01)

(52) U.S. Cl.
CPC ........ *H04L 41/065* (2013.01); *H04L 12/2801* (2013.01); *H04L 41/22* (2013.01); *H04L 43/0817* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 8,001,527 B1 * | 8/2011 | Qureshi | G06N 5/048 717/120 |
| 10,169,135 B1 * | 1/2019 | Pandey | G05B 19/058 |
| 2004/0068677 A1 * | 4/2004 | Briskey | G06F 11/366 714/38.14 |

(Continued)

*Primary Examiner* — Jonathan A Bui
(74) *Attorney, Agent, or Firm* — Eversheds Sutherland (US) LLP

(57) ABSTRACT

The present disclosure relates to systems and method for accelerated network impairment mapping. An example method may involve receiving, from a subset of downstream devices on a network, telemetry data associated with the performance of the subset of downstream devices. The example method may also involve determining, based on the telemetry data, that an impairment exists at a first device of the subset of downstream devices. The example method may also involve requesting, based on the determination that the impairment exists at the first device, telemetry data from one or more neighboring devices to the first device. The example method may also involve determining, based on the telemetry data from the one or more neighboring devices, that an impairment also exists at a second device of the one or more neighboring devices. The example method may also involve determining a lowest common ancestor to the first device and the second device on the network.

20 Claims, 14 Drawing Sheets

(56) References Cited

U.S. PATENT DOCUMENTS

| | | | | |
|---|---|---|---|---|
| 2006/0221942 | A1* | 10/2006 | Fruth | H04M 7/006 370/356 |
| 2009/0158096 | A1* | 6/2009 | Ali | H04L 69/40 714/43 |
| 2009/0328098 | A1* | 12/2009 | Beyabani | H04N 17/04 725/39 |
| 2010/0110903 | A1* | 5/2010 | Spott | H04W 40/248 370/244 |
| 2012/0192008 | A1* | 7/2012 | Suzuki | G06F 11/079 714/15 |
| 2013/0018632 | A1* | 1/2013 | Field | H04L 67/025 702/183 |
| 2013/0051248 | A1* | 2/2013 | Pei | H04L 43/0823 370/245 |
| 2013/0286852 | A1* | 10/2013 | Bowler | H04L 1/00 370/242 |
| 2014/0129876 | A1* | 5/2014 | Addepalli | G06F 11/0709 714/37 |
| 2014/0267788 | A1* | 9/2014 | Bowler | H04N 7/10 348/192 |
| 2014/0320502 | A1* | 10/2014 | Fletcher | G06T 11/206 345/440.2 |
| 2015/0142345 | A1* | 5/2015 | Anderson | H04H 20/12 702/59 |
| 2015/0288557 | A1* | 10/2015 | Gates | G06F 11/3082 714/37 |
| 2016/0179598 | A1* | 6/2016 | Lvin | H04L 41/0636 714/48 |
| 2016/0182308 | A1* | 6/2016 | Bill | H04L 41/085 370/254 |
| 2017/0033974 | A1* | 2/2017 | Shashank | H04L 41/0631 |
| 2020/0136891 | A1* | 4/2020 | Mdini | H04L 43/16 |
| 2020/0409780 | A1* | 12/2020 | Balasubramanian | G06F 11/3065 |
| 2020/0409781 | A1* | 12/2020 | Zhen | G06F 11/3006 |

\* cited by examiner

US 11,323,306 B2

SYSTEMS AND METHODS FOR ACCELERATED NETWORK IMPAIRMENT MAPPING

TECHNICAL FIELD

The disclosure generally relates to identifying impairments on network devices. In some embodiments, the disclosure may more specifically relate to identifying impairments on Data Over Cable Service Interface Specification (DOCSIS) networks.

BACKGROUND

Networks (for example DOCSIS networks) sometimes experience device impairments within the network. Conventional systems for monitoring for such impairments and identifying the particular device or devices that are the source of such impairments may involve polling (for example, requesting information from a device) the devices located on the network in certain intervals to determine the status of such devices. The manner in which the polling is performed by such conventional systems may involve polling based on a list of devices, for example, a list of devices provided by a router. However, in many cases the list may be random and not have any particular order to it. Thus, it may take up to several hours to poll every device on the network. This unintelligent polling may significantly increase the amount of time it takes to identify the exact location of an impairment on the network, which, in turn, may lead to increased downtime for customers on the network. Additionally, other faults may exist in the network beyond the devices that indicate the failure of the devices that were randomly polled. Finally, due to the time a traditional poll can take, intermittent impairments can go completely unnoticed.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
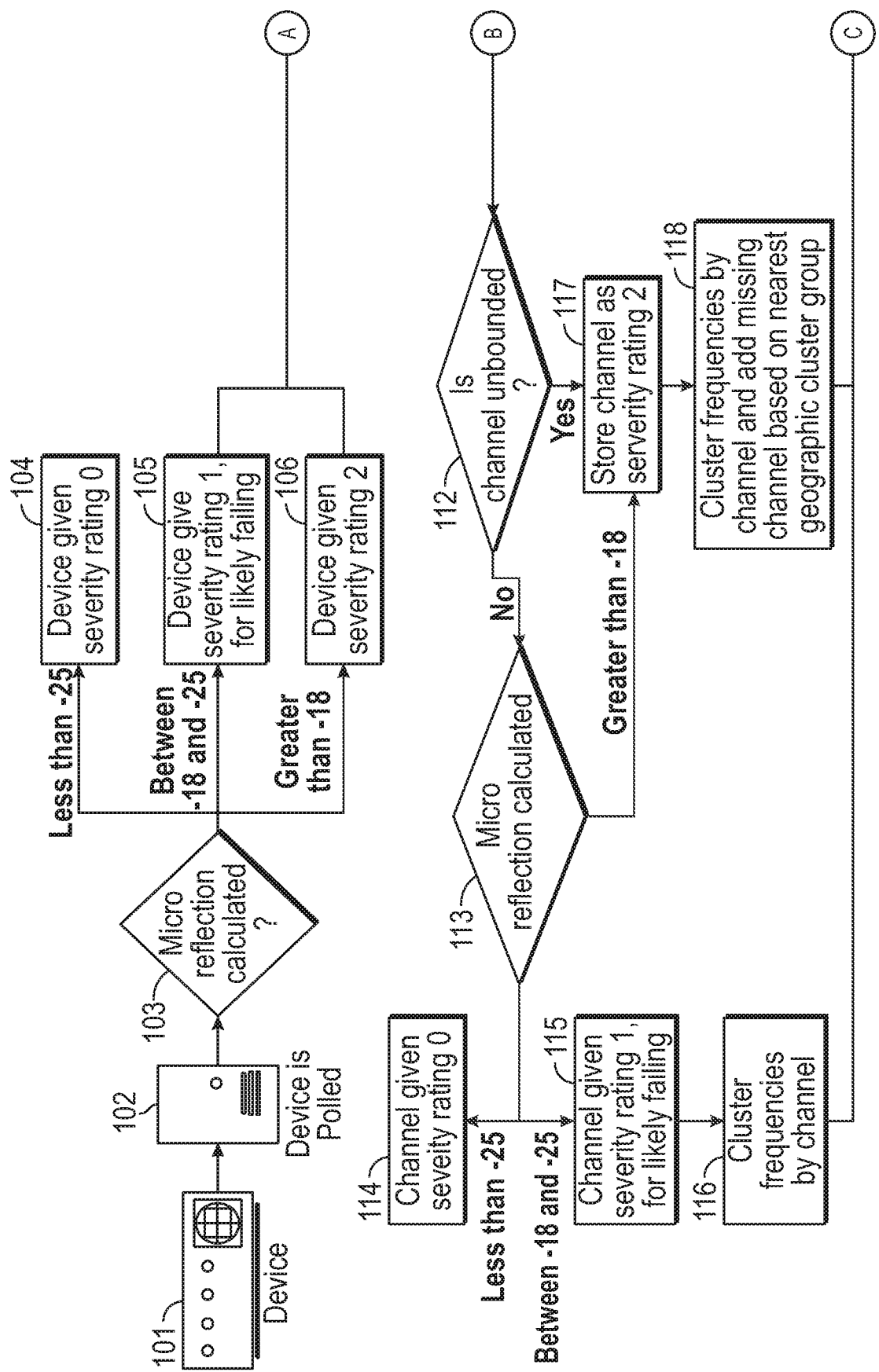
FIG. 1 depicts an example logical flowchart for accelerated network impairment mapping, in accordance with one or more example embodiments of the disclosure.
Figure 1:
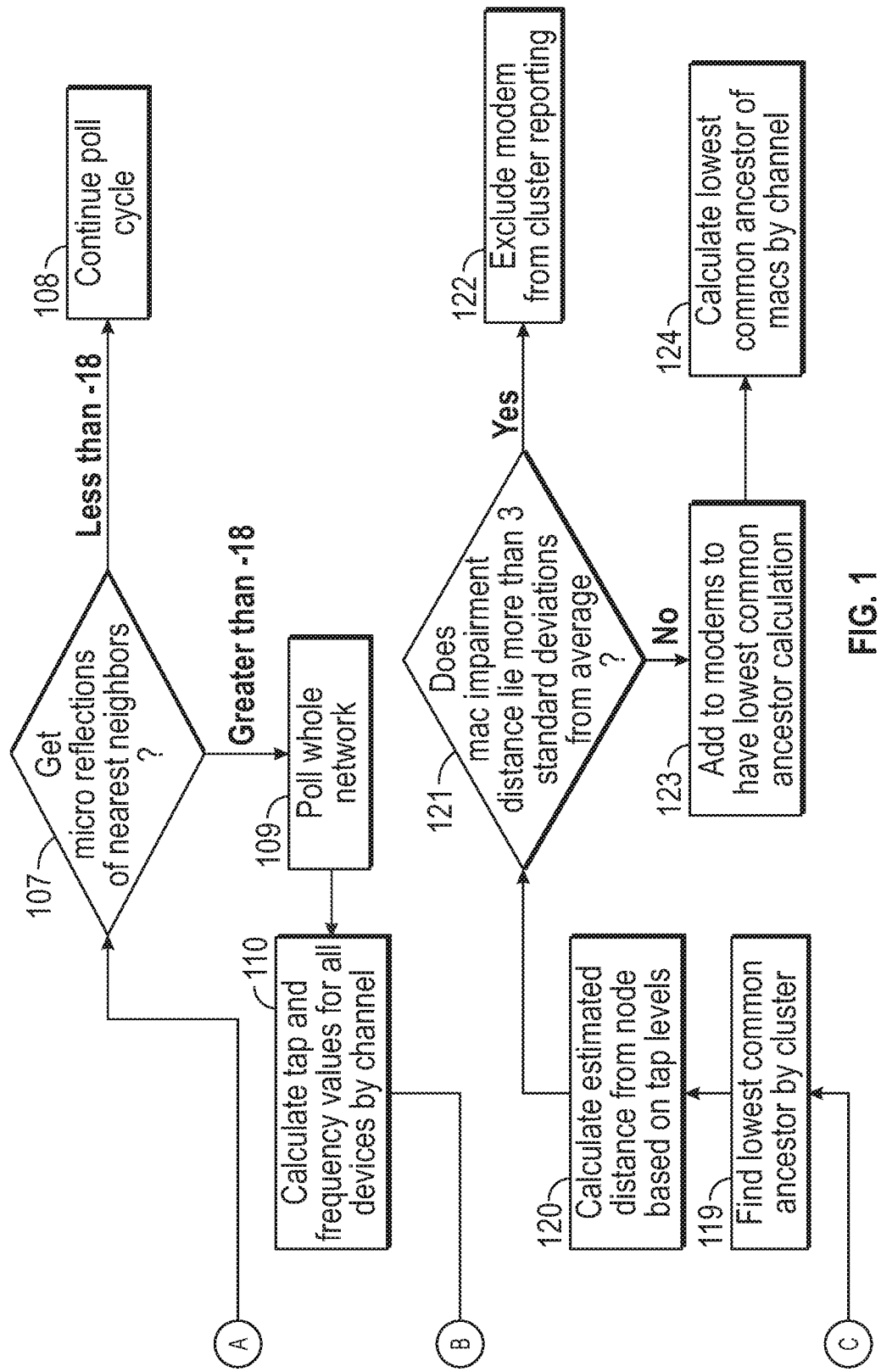

The disclosure is directed to, among other things, systems and methods for accelerated network impairment mapping. The systems and methods may relate to more rapidly identifying a source (or multiple sources, in some cases) of one or more detected device impairments on the network. An example network may be a DOCSIS network and may include one or more nodes that are connected to one or more taps that serve customer residential homes and/or commercial buildings (examples of such networks and the elements they may include may be provided below with respect to FIGS. 2A-2B, 3A-3D, and FIGS. 6-7 described below). Types of impairments experienced by devices on the network may include, but are not limited to, frequency response, micro-reflections, and group delay. Frequency response may refer to a complex quantity describing the flatness of a channel or specified frequency range. Micro-reflections fall within a class of impairments called linear distortions and may refer to a short time delay echo or reflection caused by an impedance mismatch (for example, an impedance mismatch between any of a source, transmission line, an/or a load on a network). A micro-reflection's time delay may range from less than a symbol period to several symbol periods. Group delay may include a difference in transmission time between the highest and lowest of various frequencies through a device. While many of the example networks described herein may be DOCSIS networks, it should be noted that the systems and methods described herein could similarly be applied to any other network type.

In some embodiments, the systems and methods for accelerated network impairment mapping may involve at least three aspects: rapid detection of devices experiencing an impairment, full network mapping, and root cause classification. The systems and methods described herein may allow for all of the devices within a network to be polled approximately every minute rather than the multiple hours it may take for certain conventional systems to poll the same devices of the network. The first aspect, rapid detection of devices experiencing an impairment, may be performed through intelligent polling of the devices included within the network. Intelligent polling of devices may involve capturing a representative data sampling from a subset of devices on each node of the network. In some instances, the subset of devices from which the data sampling is obtained may include a subset of devices located most downstream on the network. As one example, with regards to the network architecture depicted in FIGS. 2A-2B, the devices located most downstream may include the CPEs 102 (which may be customer modems, for example, but may also include any other device located at a customer premises). The devices that are chosen to be included in the subset of devices from which the data sample is obtained may vary and may be described in more detail below with respect to at least FIGS. 2A-2B. The subset of downstream devices may be polled iteratively until it is determined that an impairment is detected in one or more of the polled devices. The subset that is chosen for the representative data samples may remain the same through each iteration, or the subset may be changed in each iteration or after a given number of iterations in order to ensure that all of the devices on the network are polled. This intelligent polling improves upon the conventional polling methods as a representative data sample for the entire network may be determined much more rapidly than if the conventional random device polling were to be used. This may be because a representative data sample may be obtained for all of the devices on the network by polling a subset of all of the devices on the network, rather than randomly polling devices.

In some embodiments, the data included within the data sampling that is obtained from the polled devices in the network may include telemetry data. The telemetry data may include, for example, identifying information for the device itself, such as the MAC address, device status, device DOCSIS profile, channel frequency, modulation profile, modulation type, and channel width, for example. The information may be provided per channel for each device. A modulation profile may include a configuration of modulation information for subcarriers in a data transmission channel (for example, an orthogonal frequency-division multiplexing (OFDM) channel). A modulation type may include any modulation scheme, including, for example Quadrature Amplitude Modulation (QAM), orthogonal frequency-division multiplexing (OFDM), or any other possible modulation scheme implemented in DOCSIS networks or other types of networks. A channel frequency may include one or more designated frequencies at which information may be transmitted. A channel width may refer to a range of frequencies at which information may be transmitted in a given channel. The telemetry data may also include performance data associated with the device, such as forward error correction information, upstream/downstream data transfer rates, signal to noise ratios, device power levels, cable modem termination system (CMTS) power levels, a CMTS equalization coefficient, and a device equalization coefficient. The CMTS equalization coefficient and device equalization coefficient may relate to the pre-equalization of devices within the network. Pre-equalization may be a DOCSIS feature that may improve upstream performance in the presence of network impairments. At a high level, pre-equalization is performed as follows. First, a first device (for example, a CMTS) analyzes messages coming from a second device (for example, a cable modem) and evaluates the signal quality of the messages. If the first device determines that the messages can be improved by pre-equalization, the first device sends equalizer adjustment values to the second device. The second device applies these equalizer adjustment values, called coefficients, to its pre-equalizer. The result is that the second device may then transmit a pre-distorted signal to compensate for impairments between the second device and the first device. As the pre-distorted signal traverses the network it will experience the effects of RF impairments. By the time the pre-distorted signal from the second device arrives at the first device it will no longer have any of the original pre-distortion, as the RF impairments will have transformed it back into a near-ideal signal at the first device. If further adjustments are required, the first device may send more pre-equalizer coefficient values to the second device and the cycle may repeat. With this in mind, in some instances, the CMTS equalization coefficient may be an equalization coefficient used by a CMTS for data transfer from the CMTS to another device, and the device equalization coefficient may be an equalization coefficient used by a device to data transfer from the device.

In some embodiments, once all of this telemetry data is retrieved from the polled devices, it may be determined if any of the devices are experiencing an impairment. This determination may be made based on detected micro-reflections within a network. The micro reflections may be a way of determining how much equalization is occurring on a network. Since pre-equalization may be a method for overcoming noise in a network (for example, as described above), it may be assumed that high micro reflections are indicative of network impairments.

In some embodiments, once a device is identified that is experiencing an impairment through the intelligent polling, a full networking mapping (for example, a sweep of all of the devices on the network) may be performed to identify all device impairments that currently exist on the network. In some instances, the full network mapping map be performed by beginning with the device or devices on which the impairment was identified through the intelligent polling and working "outwards" through the remainder of the network. This process of working "outwards" may be depicted and described in more detail with respect to FIGS. 2A-2B. As a brief summary, beginning from the impaired device, the polling may proceed upstream through devices in the network until an upstream device with associated downstream devices is identified. Subsequently, the downstream devices associated with the current upstream device can also be polled (similar to the manner depicted in FIG. 2B, for example). The polling may also work its way laterally to other upstream devices that may include their own unique downstream devices (these upstream devices may include, for example, taps in the network). The result of this full network mapping may provide an indication of all of the devices on the network that are currently experiencing an impairment. In addition to indicating which devices on the network are impaired, devices with a same or similar root cause (for example, as determined through the root cause classification described below) may be clustered together. This may allow for the identification of geographically close device impairments, which may assist a technician in determining what geographic portion of a network needs to be addressed to alleviate a cluster of impaired devices on the network. This clustering may include, for example, K-Means clustering. With regards to the clustering, each device may be grouped by the severity of their most impaired channel. Once devices are grouped, devices with a low severity may be ignored, pre-equalization may then be converted into a sinusoidal wave that represents how the signal is being adjusted. Once a sinusoidal wave for each channel on each device is created, each channel may be clustered by the sinusoidal wave generated and devices may be placed in distinct clusters based on how similar the sinusoidal wave looks. The Silhouette coefficient may be used to determine what the number of clusters needs to be. If multiple devices appear together in different channel clusters, the clusters may be merged into a single cluster representing all channels.

In some embodiments, once full network mapping has been performed, root cause classification may then be performed. Root cause classification may involve determining one or more lowest common ancestors to the impaired devices on the network. A lowest common ancestor may be a least upstream device that is determined to be associated with the impaired devices (In short, the lowest common ancestor may be the most downstream located device that is shared as a common upstream device by some or all of the impaired devices. That is, the lowest common ancestor may be a potential originating point for impairments on downstream devices). In some instances, multiple lowest common ancestors may exist throughout the network if multiple impairments exist in physically distinct locations of the network. An example of how the lowest common ancestors may be identified through the root cause classification may be depicted and described with respect to FIG. 3A-3D. A benefit of performing this root cause classification when network impairments are detected may be that a source of an impairment may be quickly identified on the network. Once a source of the impairment is determined, a technician may be deployed to the source of the impairment to correct the issue, which may result in a more efficient elimination of multiple impairments on the network. Even if multiple independent sources of impairments were to be determined, by providing the capability to quickly map and address the most upstream source of the impairment, impairments of all downstream devices on the network can be quickly addressed. In the conventional system of randomly polling device, in contrast, technicians may be deployed to address the downstream devices that are identified as impaired, but the source of the problem may actually exist elsewhere.

Turning to the figures, FIG. 1 depicts an example overall logical flowchart 100 for accelerated network impairment mapping as described herein. The logical flowchart begins at 102 with a device 101 (for example, a device that may be located most downstream in the network. This device may be a CPE, such as a modem at a customer's home.) being polled through intelligent polling (this intelligent polling may be described in more detail in the process outlined in FIGS. 2A-2B). At 103, a micro-reflection may be calculated for the device 101 that is being polled on the network. As described above, a micro-reflection may be a linear distortion including a short time delay echo or reflection caused by an impedance mismatch in the network. The micro-reflection may be calculated using the below equations, for example:

Max=Maximum AMP point

Min=Minimum AMP point $BaseM = \sqrt[10]{(|(Max-Min)|/10)}$

Micro Reflection(dBc)=10*log 10($2^{(baseM-1)/(baseM+1)}$)

where AMP is a point on the sinusoidal wave generated from the pre-equalization coefficient being converted from a time series to a frequency. Based on the micro-reflection calculation, at 104, if it is determined that the resulting micro-reflection value is less than −25 dBc (decibels relative to carrier), then the device 101 may be assigned a severity rating of 0 (which may be out of a total maximum severity rating of 2, for example). The severity ratings may provide an indication of the severity of micro reflections being experienced by the device 101. At 105, if it is determined that the resulting value is between −18 dBc and −25 dBc, then the device 101 may be assigned a severity rating of 1, which may indicate that the device is likely experiencing an impairment. At 106, if it is determined that the resulting value is greater than −18 dBc, then the device may be assigned a severity rating of 2, which may provide a stronger indication that the device is experiencing an impairment. If the device 101 is assigned a severity rating of 0, then no additional steps may be taken. However, if the device is assigned a severity rating of 1 or 2, then, at 107, micro reflections of nearest neighbors to the device 101 may be calculated. A nearest neighbor may refer to the device closest to the original device that exists at a different address. In some instances, neighbors may be devices that share the same tap. If the micro reflections of the nearest neighbors are determined to be less than −18 dBc (for example, all the members of the same tap. If the tap in question only has a single device on it, the next tap up the network topology with a device on it is tested), then, at 108, the polling cycle of devices on the network may continue (that is, additional devices may be polled beyond the device 101 in accordance with the intelligent polling described herein). However, if the resulting value is greater than −18 dBc, then at 109, the entire network may be polled. The manner in which the entire network is polled may be further described and depicted with respect to FIG. 2B, for example. At 110, once the polling for the entire network has been performed, the tap and frequency values for all of the devices on the network may be calculated by channel. The tap values may be obtained by first by decoding one or more HEX values stored in the device's Pre-Equalization Coefficient. When decoding the HEX values, an unreal pair may be determined that may include the tap values. The tap values may be a time series that represent how much the signal was adjusted logically inside a CMTS or consumer premises equipment (CPE). Each value may be a complex number representing the total energy that passed through the tap. Frequency may be a Fast Fourier Transform of the tap values which may provide an indication of how the signal was adjusted relative to the main tap, which may be the tap with the highest energy throughput. Based on these calculations, at 112, it may be determined if each channel is unbonded. Channels may be determined as unbonded, for example, when there is no presence of the channel in polling data or the status of the channel shows as "down." As one particular example, each CMTS may have at least four frequencies for the upstream channels that may transmit in proper working conditions, and if a CPE isn't reporting a connection to one of those channels, then it may be determined that there is an impairment. However, any other number of channels may similarly be applicable. If the answer to this determination is no, then, at 113, micro reflections may be calculated for each channel. If the result of these calculations for any of the channels is a value less than −25 dBc, then, at 114, the channel may be assigned a severity rating of 0. If the result of these calculations for any of these channels is a value between −18 and −25, then the channel may be assigned a severity rating of 1, which may indicate that the channel is experiencing an impairment. Following the channel being assigned a severity rating of 1 at 115, at 116, frequencies may be clustered by channel. Each channel may have a Pre-Equalization coefficient that can be converted into a frequency via a Fast Fourier Transform. This frequency response may be unique for each device and channel, but similar frequencies can be clustered together to represent an impairment that each device is attempting to overcome. Returning back to 112, if the answer to the determination is yes, then, at 117, the channel may be assigned a severity rating of 2. From 117, frequencies may be clustered by channel and a missing channel may be added based on the nearest geographic cluster group at 118. In a similar vein as step 116, frequency responses can be clustered together. When a device is missing a channel, it may be determined that the device is impaired on that channel. The devices with missing channels may be added to existing clusters based on how close they are to an existing cluster in our network topology. For example, if a cluster of 12 customers is generated with similar frequencies on channel 33 MHz and four customers without the 33 MHz channel located one topological tap downstream of the 12 customer cluster. It can be determined that the four customers without the 33 MHz channel are in some way affected by the same impairment as the 12 customer cluster. If the four customers topologically have an unimpaired customer between them and the 12 customer cluster, they would not be included in the cluster. From 118 and 116, a lowest common ancestor may be determined for each cluster at 119. The manner in which the lowest common ancestor is determined for each cluster may be depicted and described with respect to FIG. 3A-3D. Proceeding with 120, the estimated distance from the node is calculated based on tap levels. At 121 it may be determined if the MAC impairment distance lies more than three standard deviations from an average. If the answer to the condition at 121 is yes, then the device is excluded from the cluster reporting at 122. If no, then the device is added to have lowest common ancestor calculation at 123. Finally, the lowest common ancestor of macs is calculated by channel at 124. The lowest common ancestor calculation may involve determining the last common topological feature between all members of the cluster in the network's topology. For example, a most downstream component that is upstream from a group of devices on a network (for example, a most downstream component that is upstream from a group of impaired devices on a network. This determination may be exemplified in FIGS. 3A-3D.

Figure 2A:
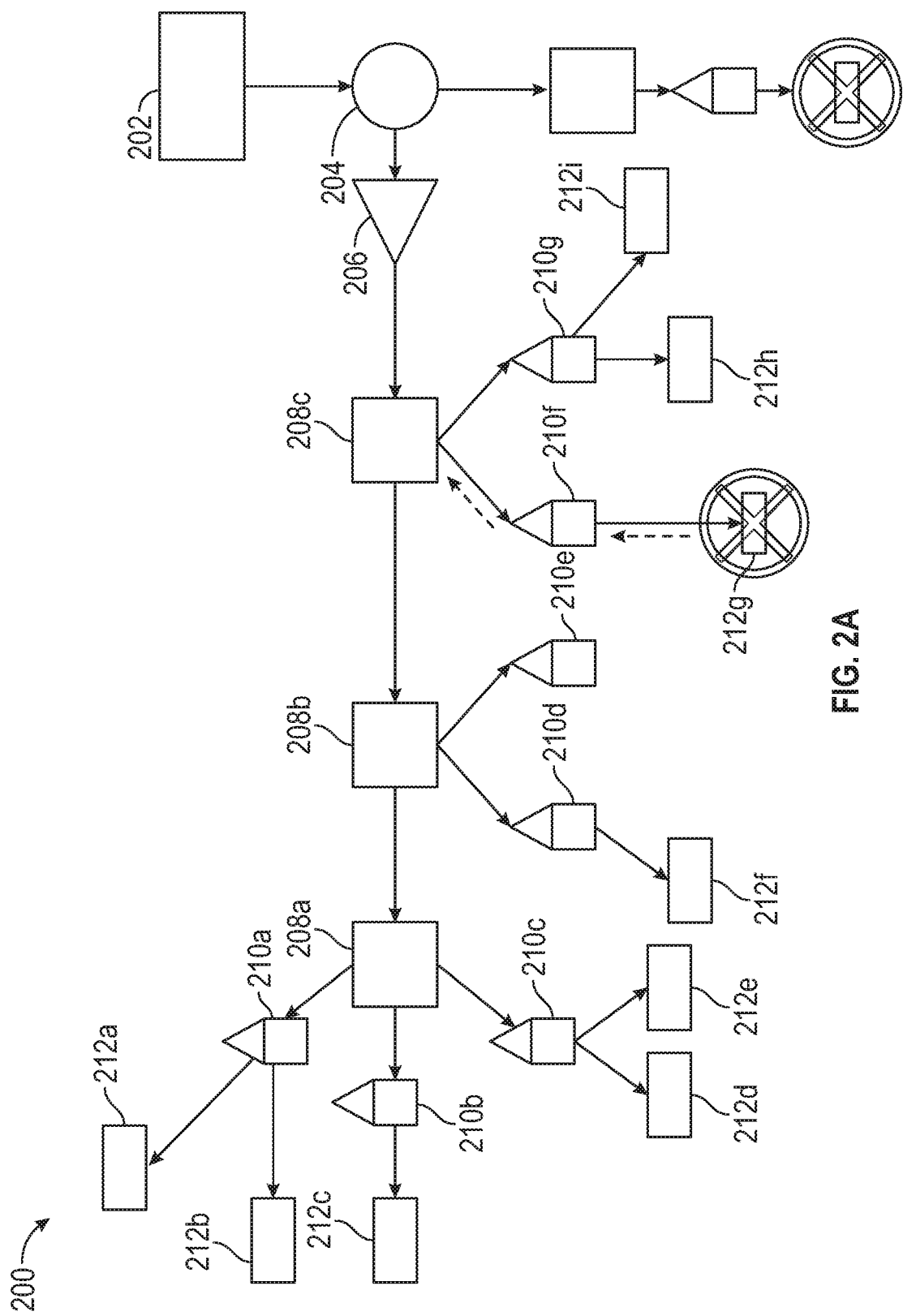
FIGS. 2A-2B depict an example device polling process, in accordance with one or more example embodiments of the disclosure.
Figure 2B:
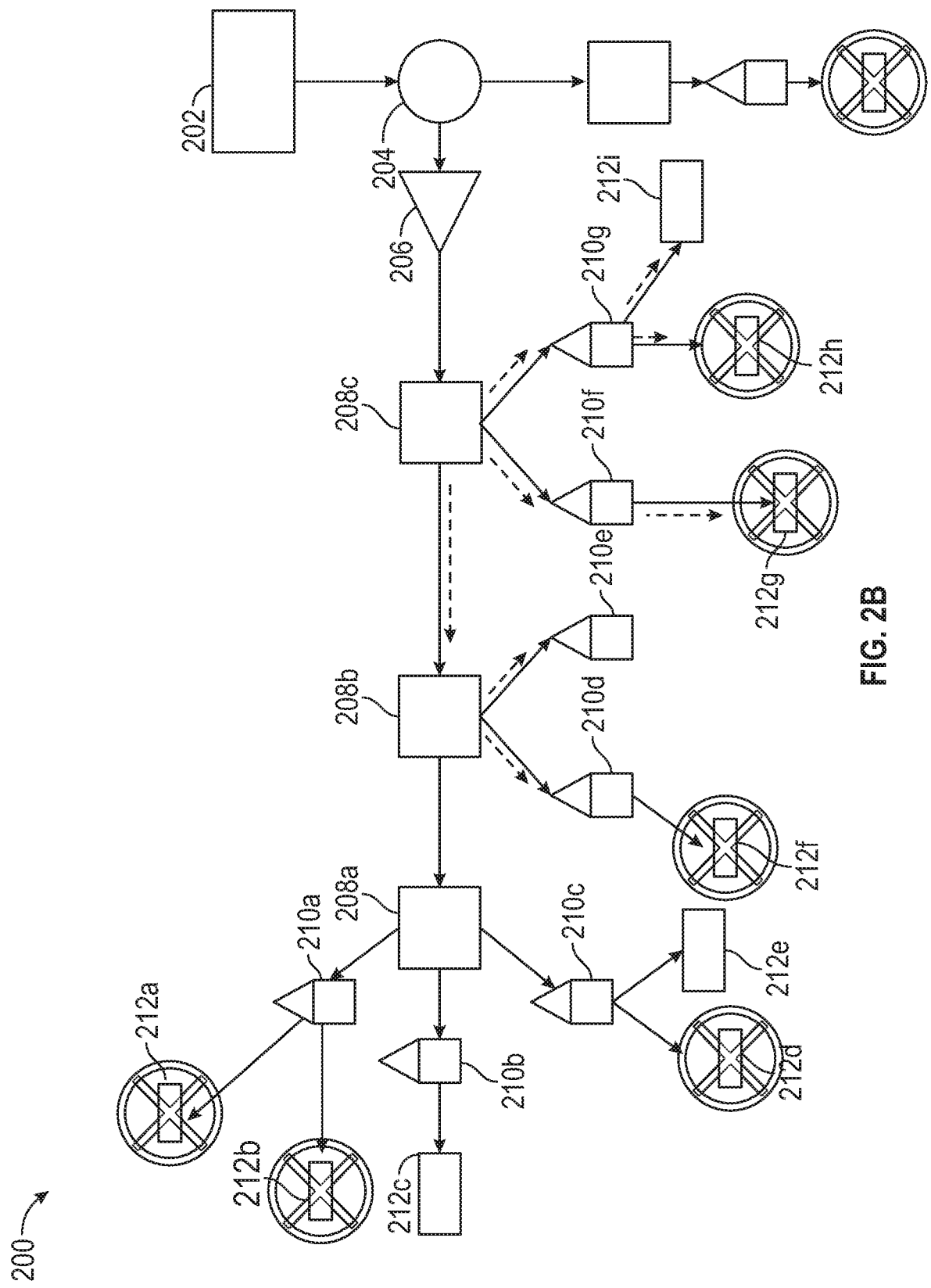

FIGS. 2A-2B depict an example intelligent polling process for a network 200. FIGS. 2A-2B may also depict an example of a full network mapping once one or more impaired devices on the network 200 are identified as described above. The example network 200 depicted in FIGS. 2A and 2B may be a DOCSIS network, however, it should be noted that this is merely for exemplification purposes and the systems and methods described herein may similarly apply to any other type of network including any other types of devices as well. The network 200 may include one or more nodes 202, one or more coaxial splitters 204, one or more amplifiers 206, one or more taps (for example, tap 208, tap 208b, tap 208c, or any other number of taps) (for simplicity, reference may be made herein to "tap 208." which may represent any of the depicted taps), one or more premises (for example, premises 210a, . . . , premises 210g, or any other number of premises) (for simplicity, reference may be made herein to "premises 210," which may represent any of the depicted premises), and one or more CPEs (for example, CPE 212a, . . . . CPE 212i, or any other number of CPEs) (for simplicity, reference may be made herein to "CPE 212." which may represent any of the depicted CPEs). In some instances, a premises 210 may be a residential home or a commercial building. A CPE 212 may be a CPE or any other type of device that may be located in a customer's home or commercial building, such as a modem, for example. The example network 200 and its potential architectures may be described in more detail with respect to FIGS. 6-7.

In some embodiments, the intelligent polling may begin by taking a representative sample of telemetry data from one or more of the most downstream devices in the network 200 (for example, the CPEs). The representative sample may include retrieving telemetry data from a subset of CPEs connected to each premises. For example, telemetry data may be retrieved for CPEs 212a, 212c, 212d, 212f, 212g, and 212h. The telemetry data may include, for example, identifying information for the device itself, such as the MAC address, device status, device DOCSIS profile, channel frequency, modulation profile, modulation type, and channel width, for example. The information may be provided by channel for each device. The telemetry data may also include performance data associated with the device, such as forward error correction information, upstream/downstream data transfer rates, signal to noise ratios, device power levels, cable modem termination system (CTMS) power levels, CMTS Equalization Coefficient, and device Equalization Coefficient. By retrieving telemetry data from each of these CPEs, a representative sampling of telemetry data for each premises on the network 200 may be quickly retrieved. In some instances, the CPEs that are polled may be changed through each polling iteration (for example, CPEs 212b, 212c, 212e, 212f, 212g, and 212i may be polled in a subsequent iteration), however, in other instances, the CPEs that are polled may remain the same.

In some embodiments, once the representative sample is obtained from the CPEs, it may be determined if any of the CPEs in the representative sample are experiencing an impairment. This determination may be made based on detected micro-reflections. The micro reflections may be a way of determining how much equalization is occurring on a network. Since pre-equalization may be a method for overcoming noise in a network, it may be assumed that high micro reflections are indicative of network impairments.

Once it is determined that a CPE on the network 200 is experiencing an impairment, the full network mapping as described above may be performed. In the example provided in FIG. 2A, the CPE 212g is determined to be experiencing an impairment (for example, as indicates with the cross through CPE 212g). The full network mapping may begin with polling (for example, retrieving telemetry data as described above) from devices upstream from the CPE 212g until an upstream device with additional downstream devices is reached (for example, the tap 208c). Once this upstream device is reached, polling may be performed for both neighboring upstream devices (for example, tap 208b), as well as any other downstream devise connected to the upstream device. This process may continue until all devices on the network 200 have been polled (or in some cases only a larger subset of devices on the network 200). This process may be illustrated in FIG. 2B. For instance, starting from tap 208c, premises 210g may be polled and then the two CPEs 212h and 212i connected to the premises 210g may subsequently be polled. The retrieval of telemetry data may thus spread "outwards" from the common upstream device until all telemetry data for all devices on the network 200 has been retrieved. The result of this full network mapping as depicted in FIG. 2B may be that CPEs 212a, 212b, 212d, 212f, and 212h are also identified as experiencing an impairment along with CPE 212g. It should be noted that although FIG. 2B only depicts the mapping as reaching premises 210d and 210e and the devices downstream from tap 208c, this is only for exemplary purposes, and the mapping may continue to spread until all of the devices on the network 200 are reached.

FIGS. 3A-3D depict an example root cause classification process for a network 300 as described above. The network 300 may be the same as or similar to, network 200, and the elements of the network 300 depicted in FIGS. 3A-3D may correspond to the elements depicted in FIGS. 2A-2B. For example, nodes 302 may correspond to nodes 202, coaxial splitters 304 may correspond to coaxial splitters 204, amplifiers 306 may correspond to amplifiers 206, taps 308 may correspond to taps 208, premises 310 may correspond to premises 210, and CPEs 312 may correspond to CPEs 212. The root cause classification process may be used to identify a lowest common ancestor for impairments in the network 300. The lowest common ancestor may include a device that is located least upstream from the impaired devices included in a given cluster of devices within the network. That is, if multiple devices are impaired, the impairments of the multiple devices may stem from a single common upstream device, which may be deemed the lowest common ancestor. As described above, identifying a lowest common ancestor for impaired devices may allow for more efficient maintenance on the network 300, as a technician may be dispatched to the location of a single device (the lowest common ancestor) rather than all of the impaired devices separately. In some cases, the impairments of the multiple devices may not stem from the same common upstream device, however, so multiple lowest common ancestors may exist or the downstream devices themselves may be their own source of impairment (for example, if multiple clusters of impaired devices exist in a network). As an example, as depicted in FIGS. 3A-3D, the network 300 may include a first cluster of devices including CPE 312a and CPE 312b (and any associated taps), and a second cluster including CPE 312d, 312f, 316g, and/or 312h (and any associated taps). In some instances, the clusters may be determined based on the devices being located in similar geographical locations. For example, it may be unlikely that two impaired devices in physically distinct parts of a town would share the same lowest common ancestor (for example, source of impairment). The clusters may also be determined in any other manner described herein as well. For exemplification purses, FIGS. 3A-3D may depict a lowest common ancestor determination for the second cluster (CPE 312d, 312f, 316g, and/or 312h) (which may be indicated by the impaired devices in the first cluster being associated with dashed crossed instead of solid crosses), however, the same lowest common ancestor determination described with respect to the second cluster may be applied to the first cluster or any other cluster of impaired devices on the network 300.

Figure 3A:
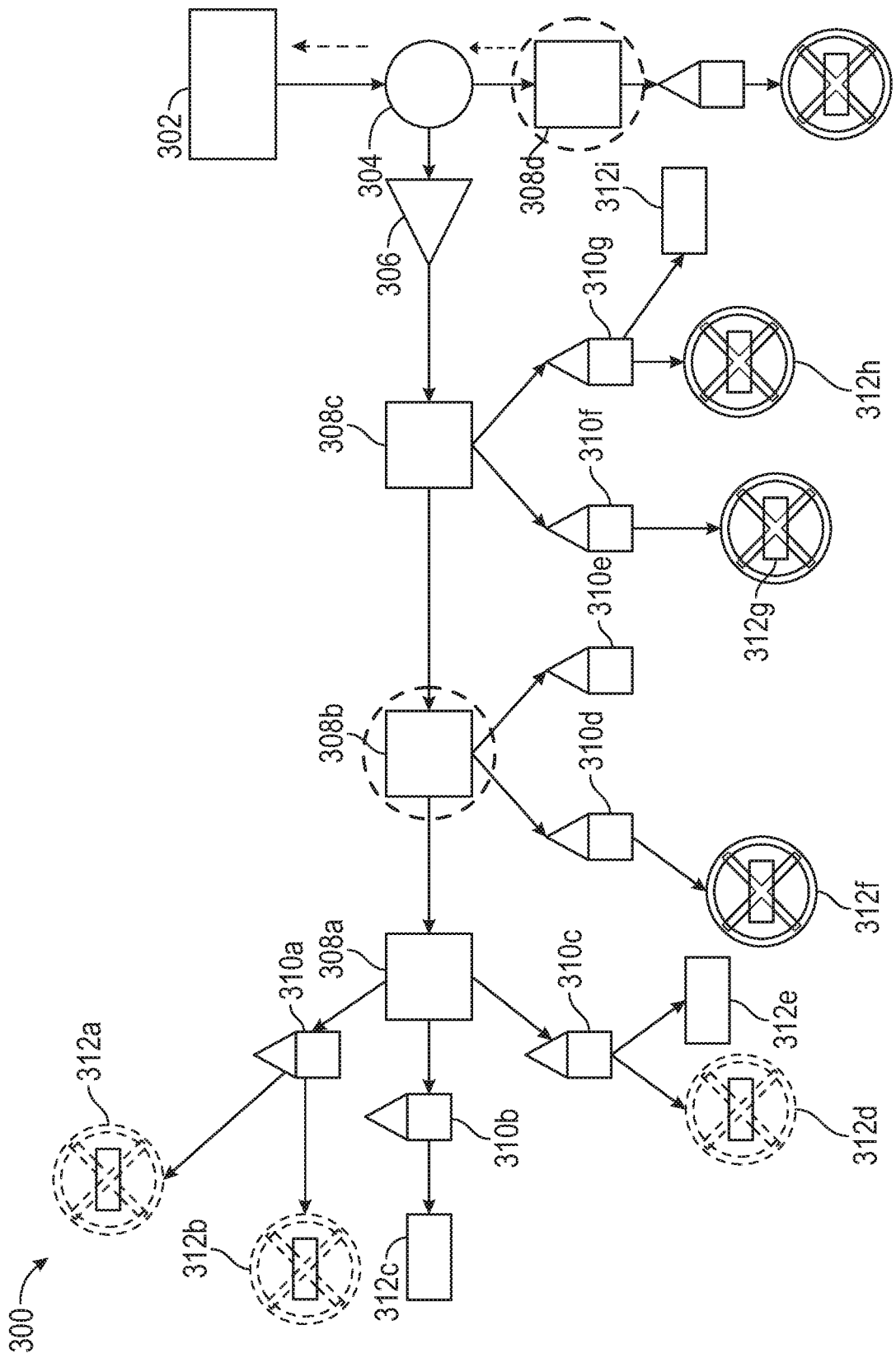
FIGS. 3A-3D depict an example lowest common ancestor determination process, in accordance with one or more example embodiments of the disclosure.

In some embodiments, the root cause classification process may involve iteratively testing some or all of the upstream devices in the cluster to determine if they are a lowest common ancestor for the impaired downstream devices. To this end, the root cause classification for the second cluster may begin by selecting an upstream device as an initial lowest common ancestor to test. The initial lowest common ancestor may be, for example, the tap 308b as depicted in FIG. 3A. The root cause classification process may also initiate by selecting a test device that may be used as a reference point to test the initial lowest common ancestor to determine if the initial lowest common ancestor is an actual lowest common ancestor in the network 300. For example, in the process depicted in FIGS. 3A-3D, the test device may be tap 308d in the network 300. It should be noted that although two particular devices are selected as the initial lowest common ancestor and test device are depicted as being chosen, any other device in the network may alternatively be selected as the initial lowest common ancestor or the test device.

In some embodiments, once the initial lowest common ancestor and test device are selected, the process may proceed with a first test. The first test may involve determining if the initial lowest common ancestor is located upstream from the test device, which may be shown in FIG. 3A. For example, the test device may cause a signal to be sent upstream. If an indication is received from the initial lowest common ancestor that the lowest common ancestor received the signal, then it may be determined that the initial lowest common ancestor may be upstream from the test device. Otherwise, the initial lowest common ancestor may not be located upstream from the initial test device. If the initial lowest common ancestor is located upstream from the initial test device, then the initial lowest common ancestor may be used as the current lowest common ancestor to be tested with other test devices in the second cluster, as may be described below. If this is not the case, then a second test may be performed. With the second test, it may be determined if the initial lowest common ancestor is located downstream from the test device, which may be shown in FIG. 3B.

In some embodiments, if the initial lowest common ancestor is determined to be located downstream from the test device, then the test device may be selected as a current lowest common ancestor for subsequent testing with other test devices in the cluster, as may be described below. If this is not the case, then a third test may be performed (for example, as depicted in FIG. 3C). The third test may involve the initial lowest common ancestor sending a signal to each successive neighbor device, and at each successive neighbor device, sending a signal to all downstream devices associated with that neighbor device. This third test may be performed until an indication is provided that the test device has received a signal. As an example of this third test. FIG. 3C may show a signal being sent to a first neighbor device to the initial lowest common ancestor, which may be tap 308c. Signals may then be sent to all of the downstream devices from tap 308c (for example, premises 310f and premises 310g and CPE 312g, CPE 312h, and CPE 312i). The test device may not be the tap 308c or any of the downstream devices of the tap 308c, so a signal may then be sent to the next neighboring device, the amplifier 306. The amplifier 306 may not have any downstream devices, and may also not be the test device, so a signal may then be sent to the next neighbor device, which may be the coaxial splitter 304. The coaxial splitter 304 may send a signal to the test device, which is located downstream from the coaxial splitter 304. Based on the test device receiving the signal from the coaxial splitter 304, it may be determined that the coaxial splitter 304 is a lowest common ancestor.

Figure 3B:
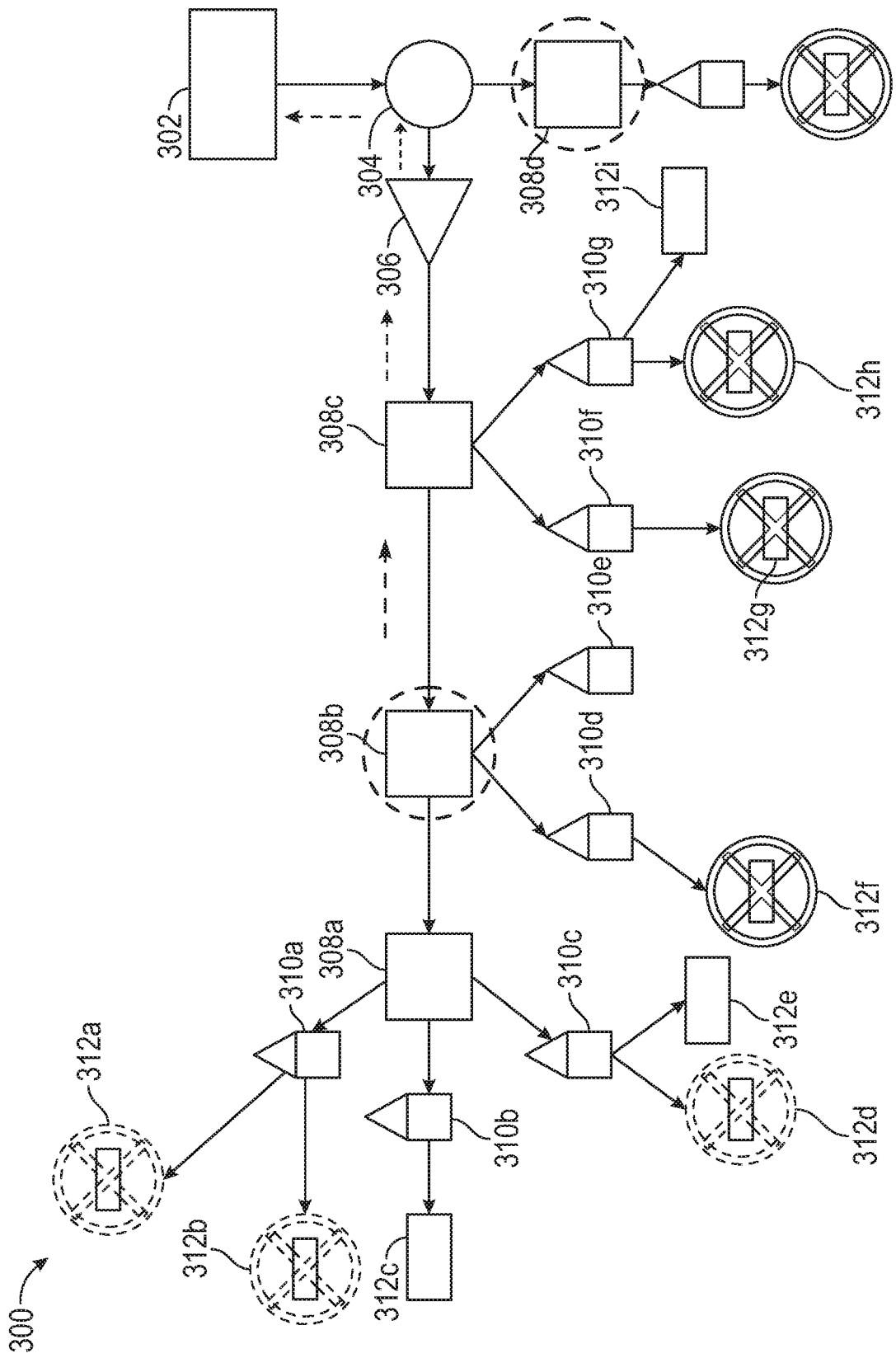
Figure 3C:
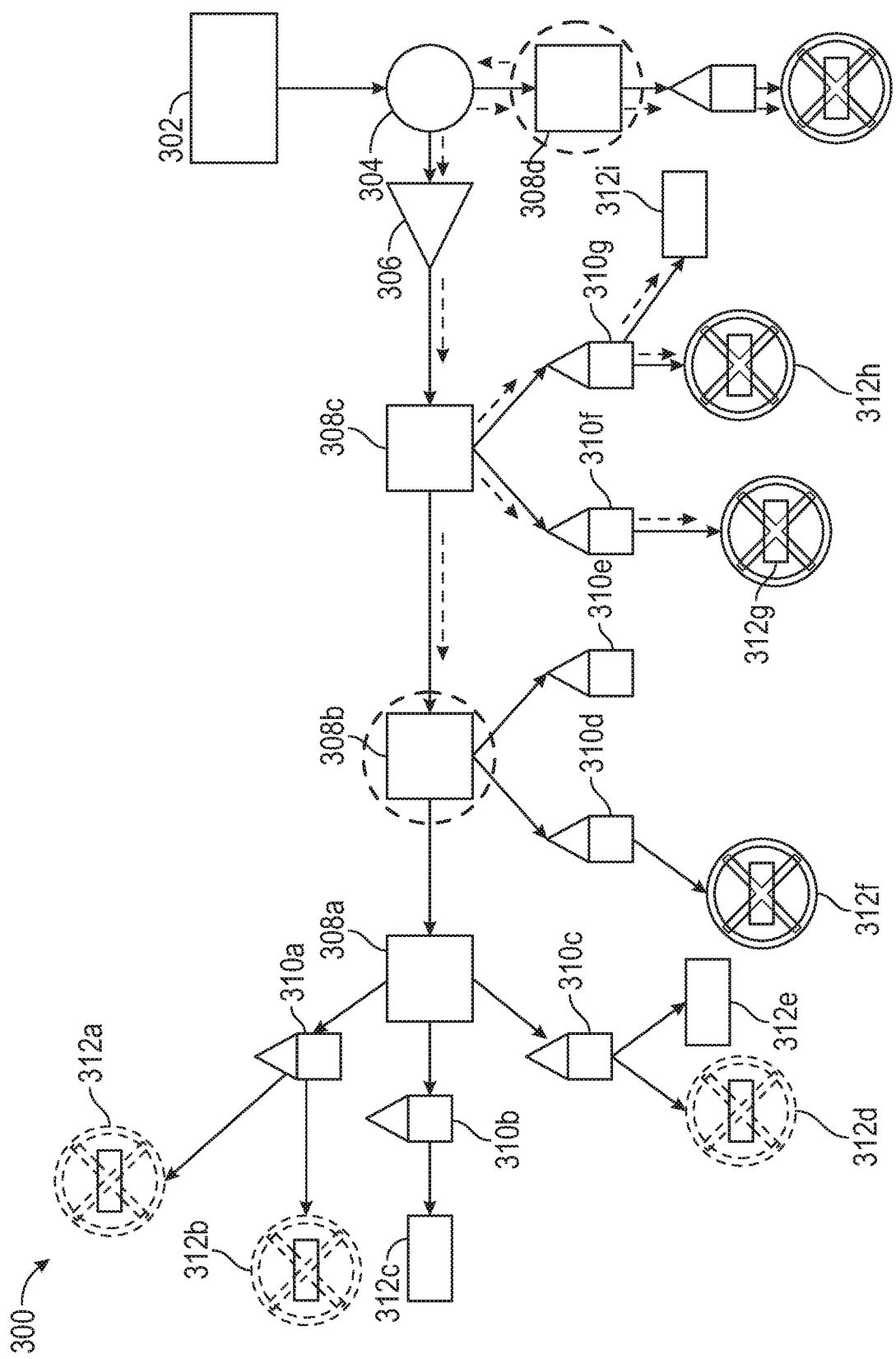
Figure 3D:
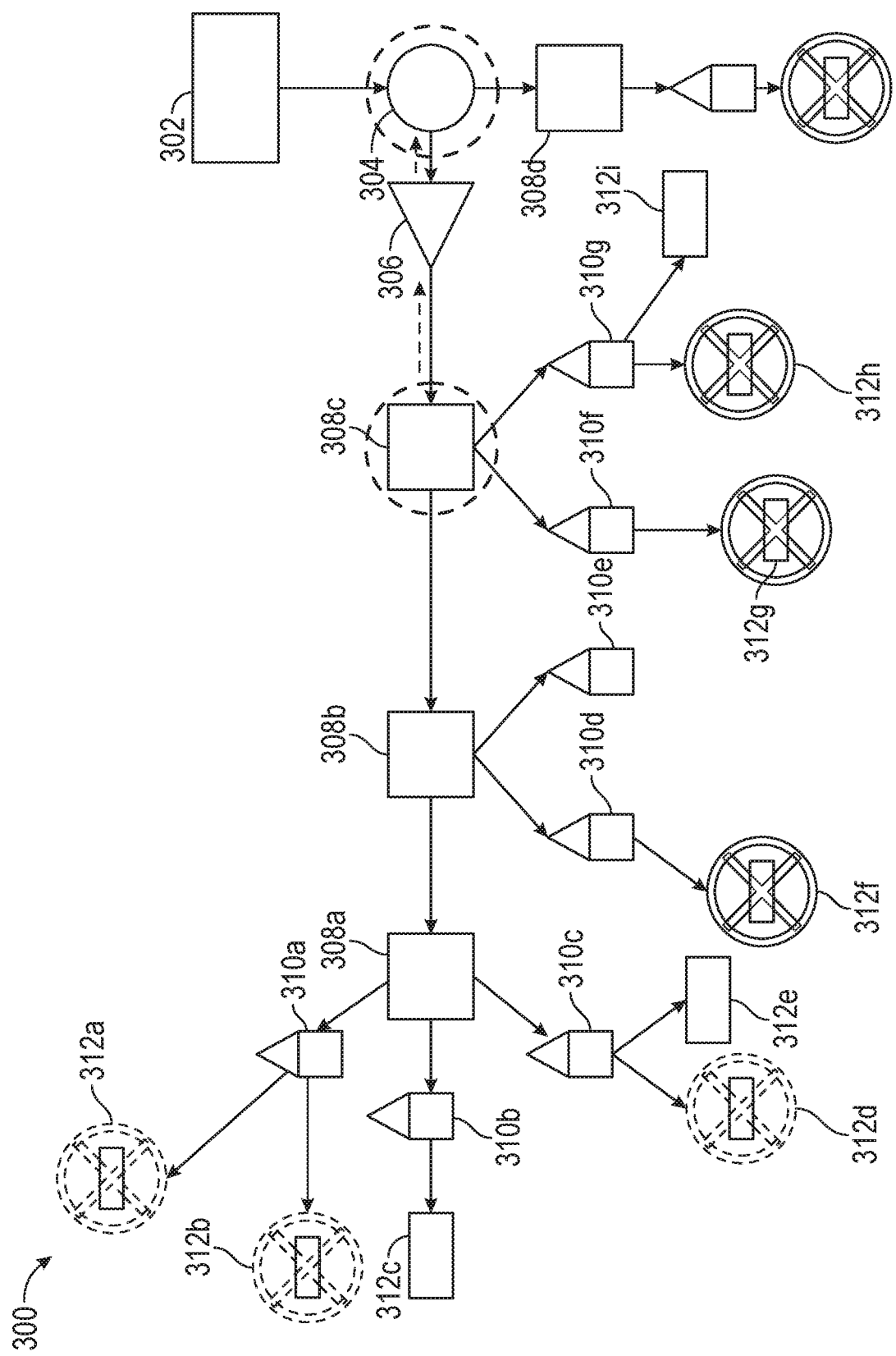
Figure 4A:
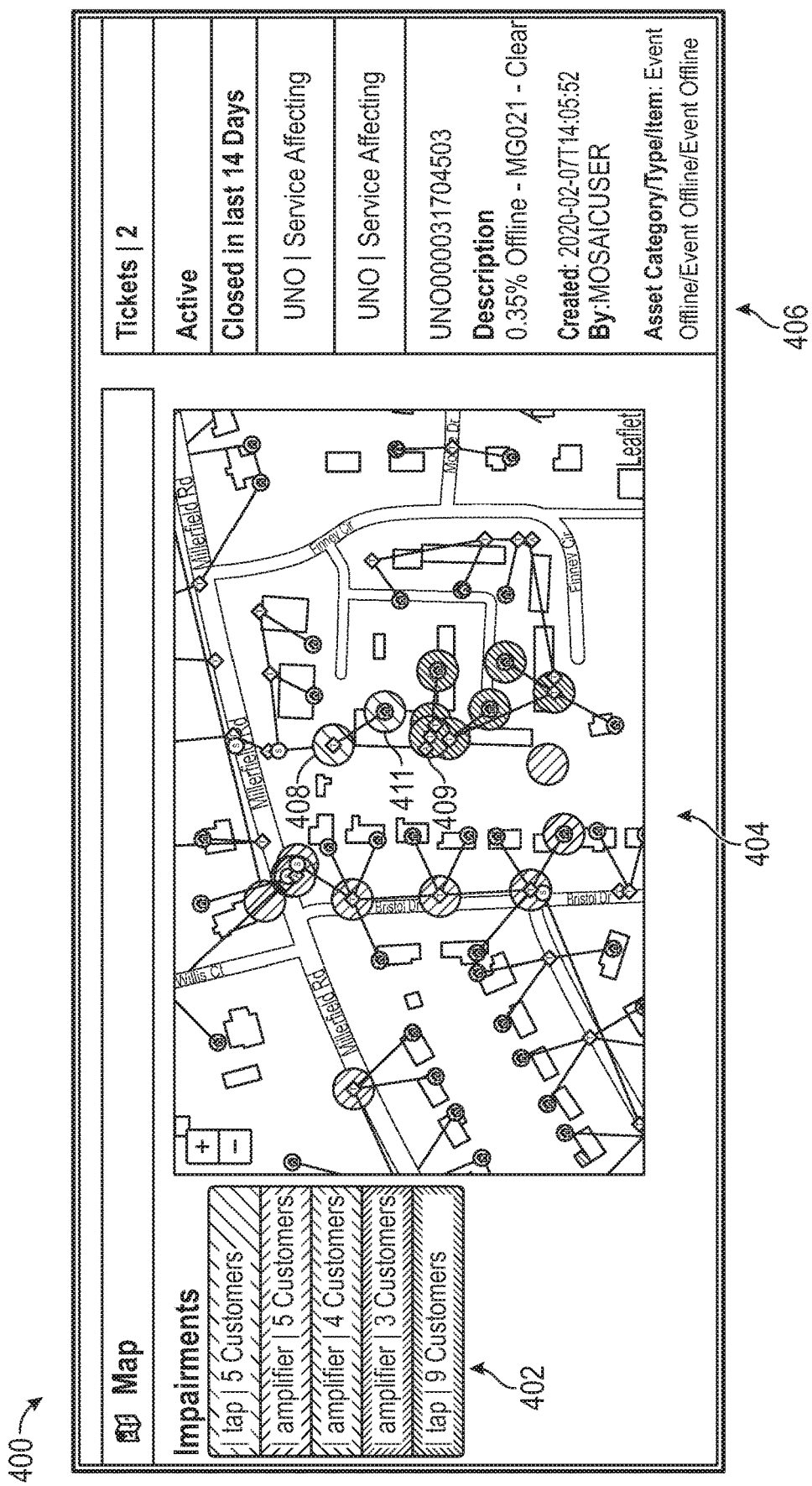
FIGS. 4A-4B depict an illustrative user interface, in accordance with one or more example embodiments of the disclosure.
Figure 4B:
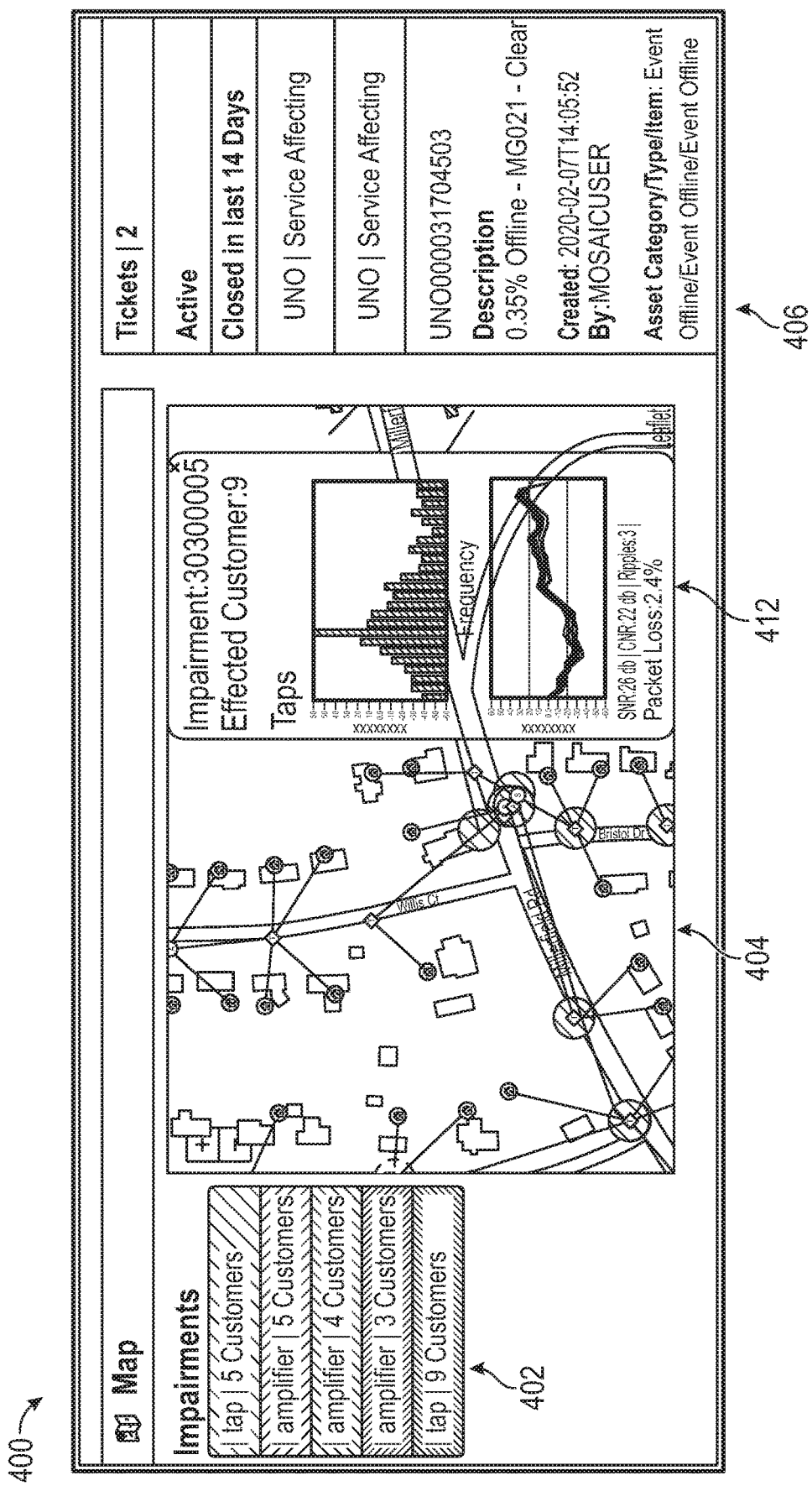

In some embodiments, this process depicted in FIGS. 3A-3C may then be repeated for the remaining taps (or any other device) in the second cluster (for example, tap 308c) using the current lowest common ancestor in place of the initial lowest common ancestor, and using the next tap (or other device) as a test device. For example, the coaxial splitter 304 may be used as the current lowest common ancestor in a next iteration, and the tap 308c may be used as the test device. This is shown in FIG. 3D, which depicts the tap 308c being selected for testing. Based on this iteration, it may be determined through the first test that the coaxial splitter 304 is located upstream from the test device (the tap 308c), so the coaxial splitter 304 may remain as the current lowest common ancestor (and the second and third tests may not be necessary to perform). If the coaxial splitter 304 remains as the current lowest common ancestor for the remaining tap devices in the second cluster, then the coaxial splitter 304 may be determined to be the actual lowest common ancestor for the second cluster. The Illustrative User Interface FIGS. 4A-4B depict an example user interface 400 that may allow a user (for example, a technician or other operator) to visually view the results of the accelerated network impairment mapping overlaid on a map including the geographic location of the devices on the network. As depicted in FIG. 4A, the user interface 400 may include at least impairment list 402, a geographic map 404, and/or a ticket list 406. In some instances, the impairment list 402 may include a list of devices that have been identified through the accelerated network impairment mapping as being impaired devices. For example, as depicted in the figure, two taps and three amplifiers have been identified as being impaired on the network. The impairment list 402 may also include a number of customers that the device serves next to each device listing. For example, the taps may serve five and nine customers respectively, and the amplifiers may serve five, four, and three customers respectively. Including the number of customers that are served by each impaired device may allow a technician to prioritize which devices to address first (for example, devices that serve a larger customer base will likely be prioritized before devices that serve a smaller customer base). The geographic map 404 may include a visual mapping of the devices on the network, how they are interconnected, and where they are geographically located. The geographic map 404 may also indicate which of the devices on the network are impaired. For example, the geographic map 404 depicted in FIG. 4A may have highlighted a first tap 408 that serves five customers, a second tap 409 that serves nine customers, and an amplifier 410 that serves five customers. The geographic map 404 may also highlight in a different manner the downstream devices served by the first tap 408, second tap 409, and amplifier 410 (for example, the first tap 408 may serve a premise 411). This geographic map 404 may provide a visual mapping of the results of the accelerated network impairment mapping to allow a technician to visually understand the impairments that exist on the network and where they need to physically travel to in order to address the source of the impairments. The user interface 400 may also include a ticket list 406. The ticket list 406 may include a list of tickets submitted by customers associated with the devices on the network depicted in the geographic map 404. Thus, the technician may be able to view the tickets and identify which of the devices on the geographic map 404 the tickets are associated with. Having this information displayed on the user interface 400 may allow the technician to then determine which of the devices on the geographic map 404 need to be addressed in order to complete the customer tickets. FIG. 4B depicts the same user interface 400 as FIG. 4A, but may also depict performance device performance data 412. That is, a user may be able to select one of the devices displayed on the geographic map 404 and be provided with a display that includes information about the performance of the device. For example, this information may be based on the telemetry data obtained from the device as described above.

Illustrative Methods

Figure 5:
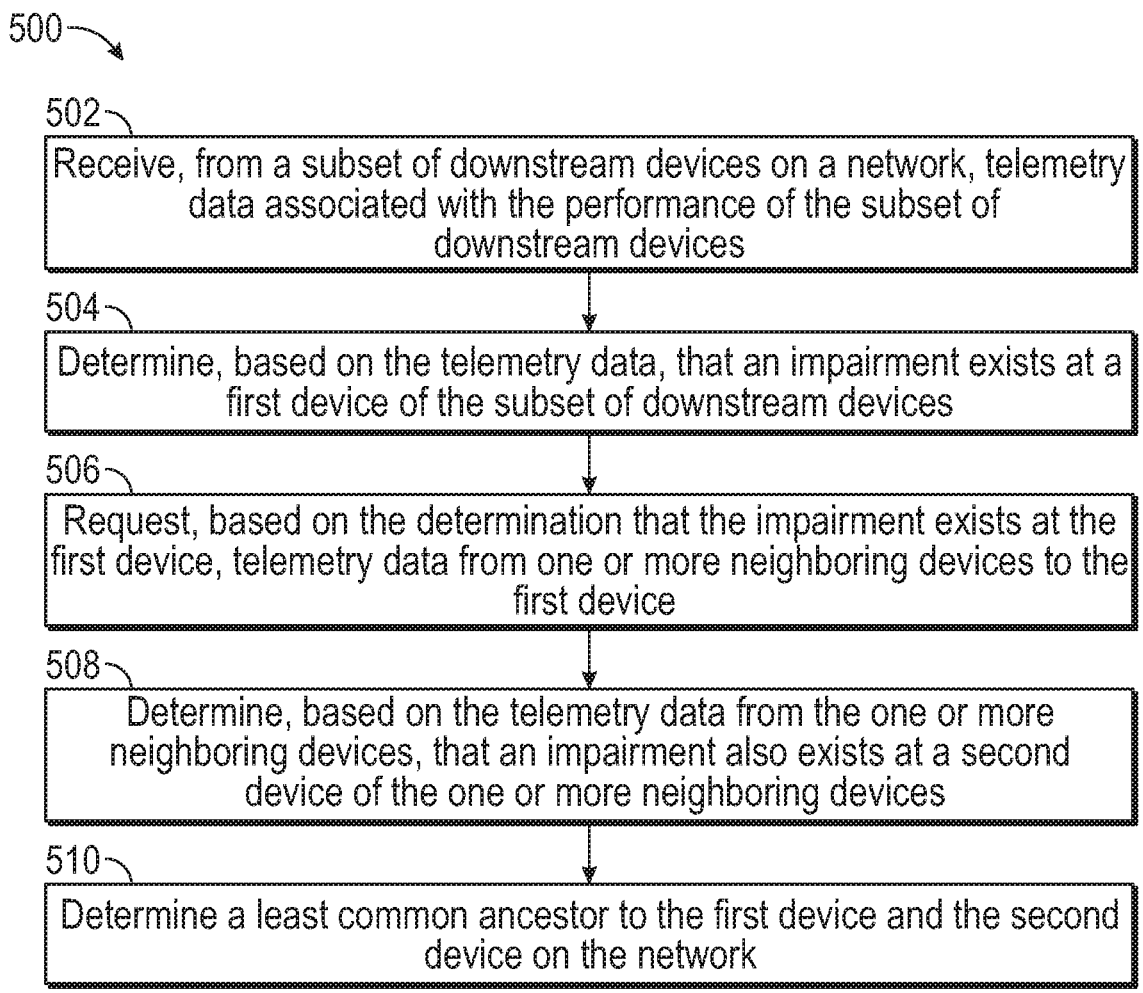
FIG. 5 depicts a flowchart of an example method, in accordance with one or more example embodiments of the disclosure.

FIG. 5 is an example method 500 for accelerated network impairment mapping in accordance with one or more example embodiments of the disclosure. At block 502 of the method 500 in FIG. 5, the method may include receiving, from a subset of downstream devices on a network, telemetry data associated with the performance of the subset of downstream devices. The telemetry data may include, for example, identifying information for the device itself, such as the MAC address, device status, device DOCSIS profile, channel frequency, modulation profile, modulation type, and channel width, for example. The information may be provided per channel for each device. The telemetry data may also include performance data associated with the device, such as forward error correction information, upstream/downstream data transfer rates, signal to noise ratios, device power levels, cable modem termination system (CMTS) power levels, a CMTS equalization coefficient, and a device equalization coefficient.

Block 504 of the method 500 may include determining, based on the telemetry data, that an impairment exists at a first device of the subset of downstream devices. This determination may be made based on detected micro-reflections within a network. The micro reflections may be a way of determining how much equalization is occurring on a network. Since pre-equalization may be a method for overcoming noise in a network (for example, as described above), it may be assumed that high micro reflections are indicative of network impairments.

Block 506 of the method 500 may include requesting, based on the determination that the impairment exists at the first device, telemetry data from one or more neighboring devices to the first device. Block 508 of the method 500 may include determining, based on the telemetry data from the one or more neighboring devices, that an impairment also exists at a second device of the one or more neighboring devices.

Block 510 of the method 500 may include determining a lowest common ancestor to the first device and the second device on the network.

The operations described and depicted in the illustrative process flows of FIG. 5 may be carried out or performed in any suitable order as desired in various example embodiments of the disclosure. The operations described and depicted in the illustrative process flows of FIG. 5 may be carried out or performed by any devices described herein, such as the network computing entity 800 described with respect to FIG. 8). Additionally, in certain example embodiments, at least a portion of the operations may be carried out in parallel. Furthermore, in certain example embodiments, less, more, or different operations than those depicted in FIG. 5 may be performed.

One or more operations of the process flows of FIG. 5 may have been described above as being performed by a user device, or more specifically, by one or more program modules, applications, or the like executing on a device. It should be appreciated, however, that any of the operations of process flows of FIG. 5 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flows of FIG. 5 may be described in the context of the illustrative vehicle transaction platform, it should be appreciated that such operations may be implemented in connection with numerous other device configurations.

Illustrative Network Architecture

Figure 6:
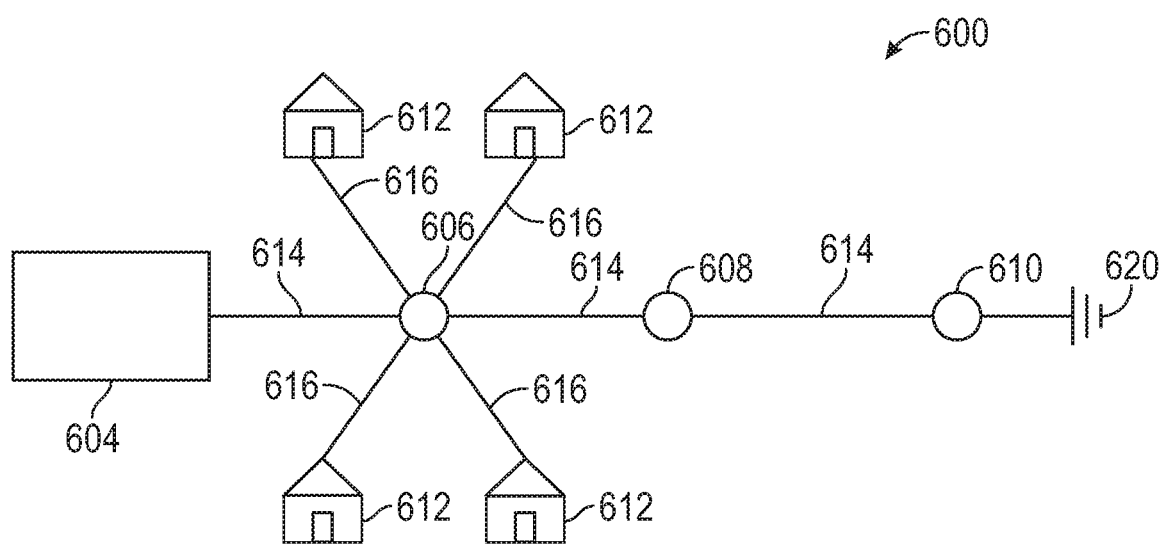
FIG. 6 depicts an example network architecture, in accordance with one or more example embodiments of the disclosure.

FIG. 6 shows an example diagram 600 of a portion of a cable network and associated devices in a particular network deployment, in accordance with example embodiments of the disclosure. In some instances, the cable network depicted in the example diagram 600 may be similar to the network 100 and/or network 200, and may provide additional details regarding the potential network architecture of such networks described herein. In some aspects, the cable network described herein can be implemented using a DOCSIS specification. In an embodiment, there can be a device 604. The device 604 can include a CMTS, which can also be referred to as an access controller, a controller, and/or a node herein. In an embodiment, the device can have a converged cable access platform (CCAP) functionality. In another embodiment, the device 604 can serve as remote physical (PHY) device, that is, a device having PHY layer functionality (that is, PHY layer functionality as described in connection with the open systems interconnection model, OSI model).

In an embodiment, there can be a fiber 614 connected to the device 604. The device 604 can further be connected to various network cable taps 606, 608, and 610, also referred to as taps or terminations herein, and can connect to various cable CPE (CM) devices, for example, at various households 612.

In some embodiments, a cable network can include a fiber optic network, which can extend from the cable operators' headend out to a neighborhood's hubsite, and finally to a coaxial cable node which serves customers, for example, 25 to 2000 households (or any number of other households, or even commercial buildings).

In an embodiment, data can be transmitted downstream from the device 604 to one or more homes 612 over drop cables (also referred to as drops herein) 616 using one or more taps 606, 608, and 610. In an embodiment, as the data is transmitted downstream from the device 604 to one or more homes 612, the taps 612 can potentially generate various impairments on the network. Alternatively or additionally, as the signals pass through from the device 604 to the taps 606, 608, and 610 over fibers 614 and to the homes 612 over one or more drops 616, the fibers 614 and/or the drops 616 can cause the signals to undergo various impairments, for example, to the power spectral density of the signals. In an embodiment, the impairment can be due to attenuation on the fibers 614 and/or drops 616. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 606, 608, and 610 to perform the gain on the attenuated signals.

In an embodiment, the homes 612, the devices in the homes 612, and taps 606, 608, and/or 610 can introduce different distortions on the drop cables 616 and/or fibers 614. In an embodiment if the distortion is introduced on a given fiber 614 feeding a first tap 606 of the taps 606, 608, and/or 610, different homes of the homes 612 may receive a similar distortion to signals being transmitted and received from one or more devices at the homes 612. In another embodiment, a distortion in at given tap of the taps 606, 608, and/or 610, a distortion at a given drop of the drops 616, or distortions associated with one or more cables and/or wires of one or more devices in a given home of the homes 612, may cause signals being received and transmitted at the various taps 606, 608, and/or 610, and/or signal being transmitted or received by the devices in the different homes 612 to undergo different signal distortions.

Likewise, in an embodiment, if the devices at various homes 612 are transmitting data upstream, the distortion to the signals experienced by devices at different homes 612 can be different. In an embodiment, the disclosed systems, methods, and apparatuses describe techniques by which various devices, for example, the various devices in the homes 612 may need to transmit to account for the different distortions on the network, as described above.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from the what the receiving device would have received absent distortions in the received signal.

In an embodiment, the receiving devices can take various measurements, for example, measurements to characterize one or more channels associated with signals received by the receiving device, and/or one or more measurements associated with he received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In some aspects, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 6 may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another aspect, a return-path or upstream signals can refer to information from the customer to the headend/hub office. The forward-path and the return-path can be carried over the same coaxial cable in both directions between the node and the customer equipment.

In some embodiments, HFC network can be structured to be asymmetrical, that is, data transmission in the downstream direction has much more data-carrying capacity than the upstream direction. Full Duplex can refer to a network specification that can improve upon DOCSIS 3.1 to use the full spectrum of the cable plant (for example, from approximately 0 MHz to approximately 1.2 GHz) at the same time in both upstream and downstream directions. This technology may facilitate multi-gigabit symmetrical services while remaining backwards compatible with DOCSIS 3.1.

Figure 7:
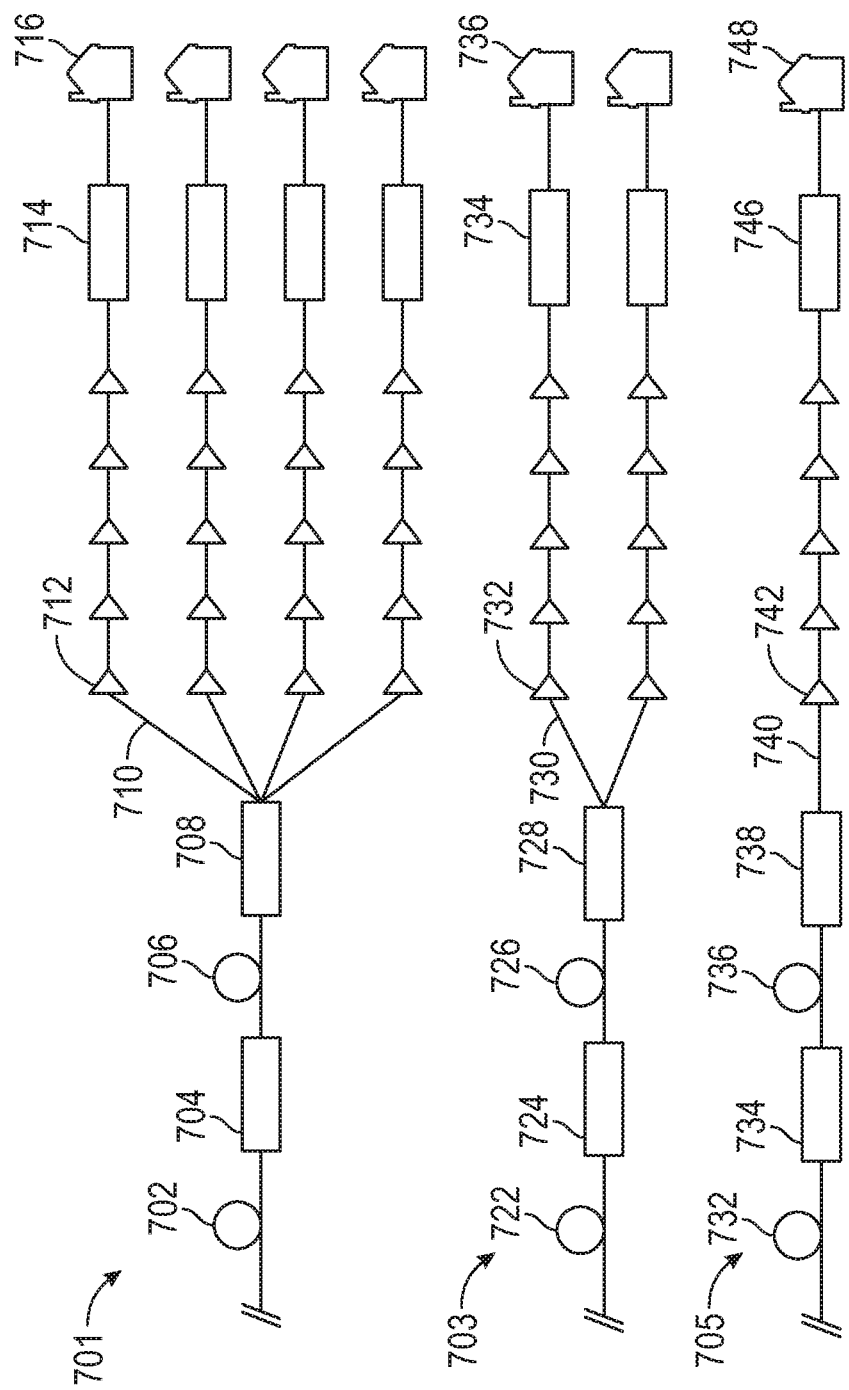
FIG. 7 depicts an example network architecture, in accordance with one or more example embodiments of the disclosure.

FIG. 7 shows example diagrams of another network architecture, in accordance with example embodiments of the disclosure. The network architecture may be similar to the network 100 and/or network 200, and may provide additional details regarding the potential network architecture of such networks described herein. That is, the networks 100 and 200 may include elements of the network architectures depicted in FIGS. 6-7. In one embodiment, as shown in diagram 701, device 704 can represent a headend device. In one aspect, device 704 can include converged cable access platform (CCAP) device. CCAP can refer to equipment that combines aspects of the functionality of edge quadrature amplitude modulation (QAM) technology with cable model termination systems (CMTSs) to provide services such as internet and voice over IP while encoding and transmitting digital video channels over the cable network.

In one embodiment, the device 704 can be electronically connected to device 708, which can represent a network node device, for example, a network node device such as remote physical (PHY) device, remote medium access control (MAC) device, and/or remote hybrid PHY/MAC device. In one aspect, the electronic connection between device 704 and device 708 can be via a cable 706, for example, a fiber optic cable. In an embodiment, device 704 and/or 708 can encompass aspects of the functionality of the management computing entity 100, described above. In one embodiment, one or more of the devices 704 and/or 708 can include a switch, for example, a network switch such as an Ethernet switch.

In some embodiments, as shown in diagram 701, the device 708 can be electronically connected to a customer premise, for example, a home 716 (also referred to herein as a household) and various devices associated with the home 716. In another aspect, the device 708 can be connected to the home 716 through one or more amplifiers 712 and/or one or more taps 714. In some respects, the amplifiers can serve to amplify signals to restore attenuation of the signals during propagation over the network. In another aspect, diagram 701 can represent a node-x embodiment, where node-x can represent a node having a variable number of amplifiers at a given node split. In particular, in diagram 701, the network can have 5 amplifiers in each of the 4 node splits.

Similarly, as shown in diagram 703, the device 728 can be electronically connected to a customer premise, for example, a home 736 (also referred to herein as a household) and various devices associated with the home 736. In another aspect, the device 728 can be connected to the home 736 through one or more amplifiers 732 and/or one or more taps 734. In the case of diagram 703, the number of node splits at the device 728 can be less than the number of node splits in diagram 701 (e.g., two node splits vs. four node splits).

Similarly, as shown in diagram 705, the device 738 can be electronically connected to a customer premise, for example, a home 748 (also referred to herein as a household) and various devices associated with the home 748. In another aspect, the device 738 can be connected to the home 748 through one or more amplifiers 742 and/or a tap 746. In the case of diagram 705, the number of node splits at the device 738 can be less than the number of node splits in diagram 703 (e.g., zero node splits vs. 2 node splits). Accordingly, diagram 703 can represent a node-zero architecture, which can work without amplifiers.

In some embodiments, the disclosure describes providing the cable networks, such as the node-x and node-zero cable network deployments described above, with the ability to turn off sounding and resource block allocations in a given portion of the spectrum associated with FDX operation. Further, the disclosure describes configuring that portion of the spectrum as being static (i.e., not dynamic) with regards to changes in the starting and ending frequency. In some aspects, the disclosure describes simulating a hisplit using FDX.

As mentioned, lowsplit can refer to an approximately 5 MHz to approximately 42 MHz split in the United States. Midsplit can refer to an approximately 5 MHz to approximately 85 MHz split in the United States. Hisplit can refer to an approximately 5 MHz to approximately 204 MHz split in the United States; however, hisplit may not be generally deployed. In some embodiments, if amplifiers are used in a network that makes use of the node-x, the amplifiers may need to be replaced with devices having an approximately 5 MHz to approximately 204 MHz (or higher, up to approximately 684 MHz) return and an approximately 1 GHz to approximately 1.2 GHz forward capability.

In some embodiments, the system represented by diagram 701 (and similarly for diagrams 703 and 705, implicitly described in the following) may include a source (not shown) which may be connected to device 704 via cables 702 and 706. In another aspect, the system can include additional devices 704 and 708 and a tap or terminator 714. The source may be configured to provide a downstream broadband signal to one or more customer devices and receive upstream signals from the one or more customer devices, for example, customer devices at the homes 716. The devices 704 and 708 may be configured (i) to receive the downstream broadband signal via the cables 702 and 706, (ii) convert the downstream broadband signal into a radio frequency downstream signal, (iii) output the downstream broadband signal onto one or more cable lines (for example, cables 702 and 706) for communication to the one or more customer devices, (iv) receive the upstream signals via the one or more cable lines, and (v) convert the received upstream signals into light signals for communication to the source via the cables 702 and 706. The terminator 714 may be in communication with the devices 704 and 708 via the cables, and the terminator 714 may be configured to output the radio frequency downstream signal for receipt by the one or more customer devices and direct the communication of the upstream signals to the optical fiber node via the one or more cables.

In some embodiments, the source may be a suitable source of broadband content, such as a cable plant. The source may be configured to generate and/or combine any number of data streams and/or data components into a broadband signal that is output by the source for receipt by one or more households, for example, homes 716. For example, the source may be configured to obtain video data streams from one or more content providers, such as television networks, premium content providers, and/or other content providers, and the source may be configured to generate a broadband signal based at least in part on the video data streams. As desired, the source may insert commercials and/or other data into a television or video component of a broadband signal. Additionally, the source may be configured to generate or obtain any number of data components that are inserted or added to a broadband signal, such as television guide data, an Internet data signal, home security data signals, voice over internet protocol (VoIP) telephone signals, etc. Any number of modulation techniques and/or data standards may be utilized by a source in the generation or compilation of a broadband data signal. For example, television data may be modulated utilizing a suitable quadrature amplitude modulation (QAM) or other modulation technique, and the modulated data may be incorporated into the broadband data signal. As another example, an orthogonal frequency-division multiple access (OFDMA) technique, a time division multiple access (TDMA) technique, an advanced time division multiple access (ATDMA) technique, a synchronous code division multiple access (SCDMA) technique, or another suitable modulation technique or scheme may be utilized to modulate data included within the broadband data signal. The broadband data signal may be configured to provide a wide variety of services to one or more households, including but not limited to, television service, telephone service, Internet service, home monitoring service, security service, etc.

In certain embodiments, the generated broadband signal may be output utilizing one or more cables 702 and/or 706, for example, fiber optic cables or optical fibers that are configured to carry the broadband signal from the source to one or more corresponding devices, for example, devices 704 and 708. For example, the radio frequency broadband signal may be processed utilizing one or more suitable wavelength-division multiplexing (WDM) devices or WDM systems, and the processed signal may be provided to or driven onto an optical fiber. A wide variety of different types of WDM devices may be utilized as desired in various embodiments of the disclosure, such as dense WDM devices and add-drop WDM devices. As desired, a WDM device may include a terminal multiplexer component that includes one or more wavelength converting transponders. Each wavelength converting transponder may receive one or more components of the input broadband signal and convert that signal into a light signal using a suitable laser, such as a 1550 nm band laser. The terminal multiplex may also contain an optical multiplexer configured to receive the various 1550 nm band signals and place or drive those signals onto a single optical fiber.

As desired, the WDM device may amplify the broadband signals that are processed by the WDM device. Additionally or alternatively, one or more line repeaters or other amplifying devices (such as amplifiers 712) may be positioned along a length of the optical fiber in order to amplify the broadband signal and compensate for any losses in optical power.

In addition to processing downstream or forward path signals that are received from the source, the WDM device may be configured to receive and process upstream signals that are communicated to the source from the households, for example, from homes 716. Cables, for example cables 702 and 706 (which can include, for example, optical fibers) may be configured to carry broadband signals between the source the devices 704 and 708, and the taps 714. These signals may include forward path signals generated by the source and return path signals generated by one or more households, for example, from homes 716. A wide variety of different optical fibers may be utilized as desired in various embodiments of the disclosure, such as multi-mode fibers, single-mode fibers, and special purpose fibers. Additionally, the optical fibers may be constructed from a wide variety of different materials, such as silica, fluorides, phosphates, and/or chalcogenides. The optical fibers may be configured to carry signals as light pulses utilizing total internal reflection.

Moreover, any number of devices 704 and 708, which can alternatively or additionally be referred to as fiber nodes may be provided. Each fiber node may be configured to receive and process downstream or forward path signals from the source. Additionally, each fiber node may be configured to receive and process upstream or return path signals received from the one or more households.

In some embodiments, once a signal has been filtered out or otherwise isolated by the amplifiers 712, the amplifiers 712 may amplify the signal. For example, the amplifiers 712 may increase the amplitude of the signal. In certain embodiments, the various components of a broadband signal (e.g., low return path, forward path, high return path) may be amplified by respective amplification components of the amplifiers 712. Each amplified signal may then be output onto or driven back onto the cable line in a desired direction for the signal. As desired, any number of diodes or other suitable devices may be incorporated into the amplifiers 712 in order to prevent or limit undesired leakage of an amplified signal in a direction from which the signal was received. For example, the amplifiers 712 may receive a return path signal from a terminator 714 or other amplifier, the amplifiers 712 may amplify the signal, and the amplifier may output the signal in an upstream direction towards devices 704 and 708 and/or source while limiting the output or leakage of the signal in a downstream direction.

The amplifiers 712 may include a wide variety of gains as desired in various embodiments of the disclosure. Additionally, as desired, different gains may be utilized for different components of a broadband signal. In certain embodiments, the amplifiers 712 may be powered by a received broadband signal, such as a received downstream signal. Additionally or alternatively, the amplifiers 712 may be powered by one or more batteries and/or external power sources. In certain embodiments, the power requirements of the amplifiers 712 may be based at least in part on the modulation technique(s) utilized in association with the broadband signals that are amplified. In one example embodiment, a relatively low power amplifier may be provided in association with an OFDMA modulation technique.

Any number of terminators 714 or taps may be connected to a cable line. A terminator 714 may form an access point from which one or more households, such as households 716, may be provided with broadband services. Any number of households may be serviced by a terminator 714 as desired in various embodiments of the disclosure. For example, in certain embodiments, up to four households may be serviced by a terminator 714. As desired, a cable drop or other signal line (e.g., a coaxial cable or RF cable) may extend from the terminator 714 to a household 716. In this regard, signals may be provided to and/or received from the household 716.

In an embodiment, the signals transmitted between the CTMS and the CMs can be purified via echo cancellation both in the analog and digital domain. In another embodiment, an analog echo canceller can reduce the echoes of the signal in the analog domain. In an embodiment the analog echo canceller can reduce the echo, group delay, noise amplitude, and the like, of the signal. The signal can, alternatively or additionally, proceed to an analog-to-digital converter (ADC) for conversion to the digital domain. In an embodiment, the signal can proceed thereafter to a digital echo canceller, which can remove echoes and the like in the digital domain. In an embodiment, the output of the digital echo canceler can be transmitted from the CMTS to a device, for example, a cable CPE.

Illustrative Computing Device

Figure 8:
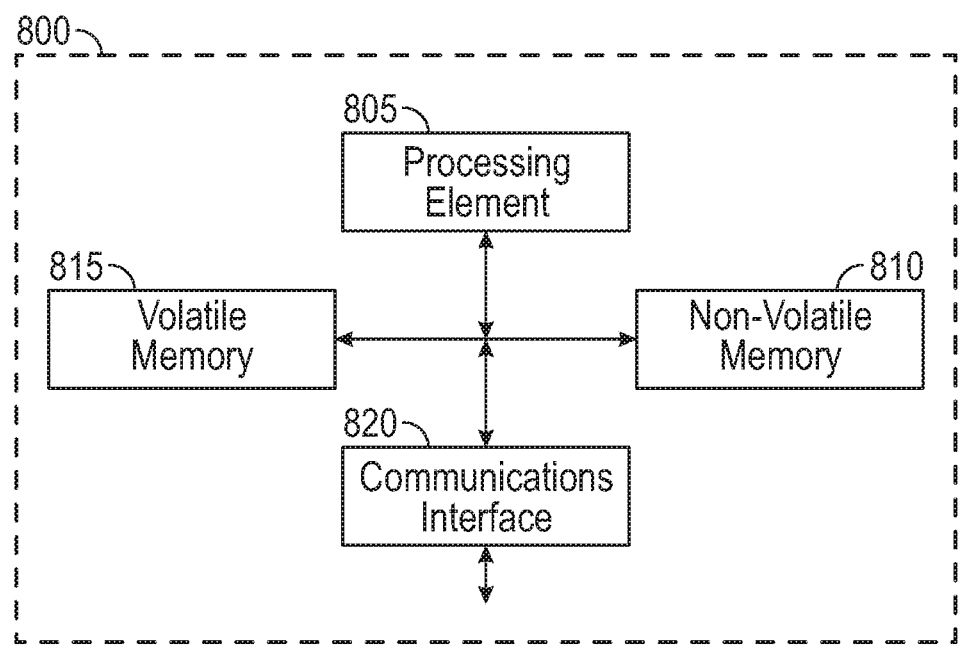
FIG. 8 depicts an example computing entity, in accordance with one or more example embodiments of the disclosure.

FIG. 8 provides a schematic of a network computing entity 800 according to one embodiment of the present disclosure. The computing entity may be used to perform any of the operations described herein, such as the accelerated network impairment mapping described with respect to any of FIGS. 1-4, for example. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, and the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the network computing entity 100 may also include one or more communications interfaces 820 for communicating with various computing entities, such as by communicating data, content, information, and/or similar terms used herein interchangeably that can be transmitted, received, operated on, processed, displayed, stored, and/or the like. For instance, the network computing entity 100 may communicate with the user devices 110 and/or a variety of other computing entities.

As shown in FIG. 8, in one embodiment, the network computing entity 100 may include or be in communication with one or more processing elements 805 (also referred to as processors, processing circuitry, and/or similar terms used herein interchangeably) that communicate with other elements within the network computing entity 800 via a bus, for example. As will be understood, the processing element 805 may be embodied in a number of different ways. For example, the processing element 805 may be embodied as one or more complex programmable logic devices (CPLDs), microprocessors, multi-core processors, coprocessing entities, application-specific instruction set processors (ASIPs), microcontrollers, and/or controllers. Further, the processing element 805 may be embodied as one or more other processing devices or circuitry. The term circuitry may refer to an entirely hardware embodiment or a combination of hardware and computer program products. Thus, the processing element 805 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 805 may be configured for a particular use or configured to execute instructions stored in volatile or non-volatile media or otherwise accessible to the processing element 805. As such, whether configured by hardware or computer program products, or by a combination thereof, the processing element 805 may be capable of performing steps or operations according to embodiments of the present disclosure when configured accordingly.

In one embodiment, the network computing entity 800 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 810, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM. Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the network computing entity 800 may further include or be in communication with volatile media (also referred to as volatile storage, memory, memory storage, memory circuitry and/or similar terms used herein interchangeably). In one embodiment, the volatile storage or memory may also include one or more volatile storage or memory media 815, including but not limited to RAM, DRAM, SRAM, FPM DRAM. EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 805. Thus, the databases, database instances, database management systems, data, applications, programs, program modules, scripts, source code, object code, byte code, compiled code, interpreted code, machine code, executable instructions, and/or the like may be used to control certain aspects of the operation of the network computing entity 100 with the assistance of the processing element 805 and operating system.

As indicated, in one embodiment, the network computing entity 100 may also include one or more communications interfaces 820 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the network computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA). Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the network computing entity 100 may include or be in communication with one or more input elements, such as a keyboard input, a mouse input, a touch screen/display input, motion input, movement input, audio input, pointing device input, joystick input, keypad input, and/or the like. The network computing entity 100 may also include or be in communication with one or more output elements (not shown), such as audio output, video output, screen/display output, motion output, movement output, and/or the like.

As will be appreciated, one or more components of the network computing entities 800 may be located remotely from other network computing entity 800 components, such as in a distributed system. Furthermore, one or more of the components may be combined and additional components performing functions described herein may be included in the network computing entity 800. Thus, the network computing entity 800 can be adapted to accommodate a variety of needs and circumstances. As will be recognized, these architectures and descriptions are provided for example purposes only and are not limiting to the various embodiments.

That which is claimed is:

1. A system comprising:
    at least one processor; and
    at least one memory storing computer-executable instructions, that when executed by the at least one processor, cause the at least one processor to:
    receive, by a headend device, from a subset of downstream household devices on a network, telemetry data associated with a performance of the subset of downstream household devices;
    determine, based on the telemetry data, a value of a micro-reflection at a first household device, wherein a micro-reflection is a short time delay echo or reflection caused by an impedance mismatch;
    determine that the value of the micro-reflection is greater than a threshold value;
    determine, based on the determination that the value of the micro-reflection is greater than the threshold value, that a first impairment exists at a first downstream household device of the subset of downstream household devices;
    request, based on the determination that the first impairment exists at the first downstream household device, telemetry data from one or more neighboring household devices to the first downstream household device;
    determine, based on the telemetry data from the one or more neighboring household devices, that a second impairment exists at a second household device of the one or more neighboring household devices; and
    determine a lowest common ancestor device to the first downstream household device and the second household device on the network.

2. The system of claim 1, wherein request telemetry data from one or more neighboring household devices to the first downstream household device further comprises:
    request telemetry data from a first upstream device that is upstream to the first downstream household device;
    determine that the first upstream device includes a third downstream household device in addition to the first downstream household device; and
    request telemetry data from the third downstream household device.

3. The system of claim 2, wherein request telemetry data from one or more neighboring household devices to the first downstream household device further comprises:
    determine that a second upstream device is located laterally to the first upstream device;
    request telemetry data from the second upstream device;
    determine that the second upstream device includes one or more downstream household devices including a fourth downstream household device; and
    request telemetry data from the fourth downstream household device.

4. The system of claim 1, wherein determine a lowest common ancestor to the first downstream household device and the second household device on the network further comprises:
    select a first upstream device as an initial lowest common ancestor;
    select a second upstream device as a first test device; and
    determine that the first upstream device is located upstream from the second upstream device.

5. The system of claim 1, wherein the subset of downstream household devices include household devices that are most downstream on the network, the network being a Data Over Cable Service Interface Specification (DOCSIS) network.

6. The system of claim 1, further comprising present the first downstream household device, second household device, and lowest common ancestor on a user interface, the user interface including an overlay of the first downstream household device, second household device, and lowest common ancestor on a geographic map.

7. The system of claim 1, wherein the computer-executable instructions further cause the at least one processor to:
    request, based on determining that a micro-reflection at the second household device exceeds the threshold value, telemetry data from one or more additional devices in the network.

8. The system of claim 7, wherein the one or more additional devices include all of the remaining devices in the network.

9. The system of claim 1, wherein the subset of downstream household devices on a network including at least one device upstream from the subset of downstream household devices, and wherein the subset of downstream household devices comprises only devices that are located furthest downstream in the network.

10. A method, comprising:
    receiving, by one or more processors, from a subset of downstream household devices on a network, telemetry data associated with a performance of the subset of downstream household devices;
    determining, based on the telemetry data, a value of a micro-reflection at a first household device, wherein a micro-reflection is a short time delay echo or reflection caused by an impedance mismatch;

determining that the value of the micro-reflection is greater than a threshold value;

determining, based on the determination that the value of the micro-reflection is greater than the threshold value, that a first impairment exists at a first downstream household device of the subset of downstream household devices;

requesting, based on the determination that the first impairment exists at the first downstream household device, telemetry data from one or more neighboring household devices to the first downstream household device;

determining, based on the telemetry data from the one or more neighboring household devices, that a second impairment exists at a second downstream household device of the one or more neighboring household devices; and determining a lowest common ancestor to the first downstream household device and the second downstream household device on the network.

11. The method of claim 10, wherein requesting telemetry data from one or more neighboring household devices to the first downstream household device further comprises:

requesting telemetry data from a first upstream device that is upstream to the first downstream household device;

determining that the first upstream device includes a third downstream household device in addition to the first downstream household device; and requesting telemetry data from the third downstream household device.

12. The method of claim 11, wherein requesting telemetry data from one or more neighboring household devices to the first downstream household device further comprises:

determining that a second upstream device is located laterally to the first upstream device;

requesting telemetry data from the second upstream device;

determining that the second upstream device includes one or more downstream household devices including a fourth downstream household device; and requesting telemetry data from the fourth downstream household device.

13. The method of claim 10, wherein determining a lowest common ancestor to the first downstream household device and the second downstream household device on the network further comprises:

selecting a first upstream device as an initial lowest common ancestor;

selecting a second upstream device as a first test device; and determining that the first upstream device is located upstream from the second upstream device.

14. The method of claim 10, wherein the subset of downstream household devices include devices that are most downstream on the network, the network being a Data Over Cable Service Interface Specification (DOCSIS) network.

15. The method of claim 10, further comprising presented the first downstream household device, second household device, and lowest common ancestor on a user interface, the user interface including an overlay of the first downstream household device, second household device, and lowest common ancestor on a geographic map.

16. A non-transitory computer readable medium including computer-executable instructions stored thereon, which when executed by one or more processors of a wireless access point, cause the one or more processors to perform operations of:

receiving, by one or more processors, from a subset of downstream household devices on a network including at least one device upstream from the subset of downstream household devices, telemetry data associated with the performance of the subset of downstream household devices, wherein the subset of downstream household devices comprises only devices that are located furthest downstream in the network;

determining, based on the telemetry data, a value of a micro-reflection at a first household device, wherein a micro-reflection is a short time delay echo or reflection caused by an impedance mismatch;

determining that the value of the micro-reflection is greater than a threshold value;

determining, based on the determination that the value of the micro-reflection is greater than the threshold value, that a first impairment exists at a first downstream household device of the subset of downstream household devices;

requesting, based on the determination that the first impairment exists at the first downstream household device, telemetry data from one or more neighboring household devices to the first downstream household device;

determining, based on the telemetry data from the one or more neighboring household devices, that a second impairment exists at a second downstream household device of the one or more neighboring household devices; and determining a lowest common ancestor to the first downstream household device and the second downstream household device on the network.

17. The non-transitory computer readable medium of claim 16, wherein requesting telemetry data from one or more neighboring devices to the first downstream household device further comprises:

requesting telemetry data from a first upstream device that is upstream to the first downstream household device;

determining that the first upstream device includes a third downstream household device in addition to the first downstream household device; and requesting telemetry data from the third downstream household device.

18. The non-transitory computer readable medium of claim 17, wherein requesting telemetry data from one or more neighboring household devices to the first downstream household device further comprises:

determining that a second upstream device is located laterally to the first upstream device;

requesting telemetry data from the second upstream device;

determining that the second upstream device includes one or more downstream household devices including a fourth downstream household device; and requesting telemetry data from the fourth downstream household device.

19. The non-transitory computer readable medium of claim 16, wherein determining a lowest common ancestor to the first downstream household device and the second downstream household device on the network further comprises:

selecting a first upstream device as an initial lowest common ancestor;

selecting a second upstream device as a first test device; and determining that the first upstream device is located upstream from the second upstream device.

20. The non-transitory computer readable medium of claim 16, wherein the subset of downstream household devices include devices that are most downstream on the network, the network being a Data Over Cable Service Interface Specification (DOCSIS) network.

\* \* \* \* \*